(12) United States Patent
Kaszas

(10) Patent No.: US 8,613,298 B2
(45) Date of Patent: *Dec. 24, 2013

(54) FUNCTIONALIZED ELASTOMERS

(75) Inventor: Gabor Kaszas, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1097 days.

This patent is subject to a terminal disclaimer.

(21) Appl. No.: 12/120,970

(22) Filed: May 15, 2008

(65) Prior Publication Data

US 2009/0283187 A1   Nov. 19, 2009

(51) Int. Cl.
*B60C 1/00* (2006.01)
*C08F 2/60* (2006.01)

(52) U.S. Cl.
USPC ........................................ 152/450; 526/237

(58) Field of Classification Search
USPC ........................................ 152/450; 526/237
See application file for complete search history.

(56) References Cited

U.S. PATENT DOCUMENTS

| | | | |
|---|---|---|---|
| 3,099,644 A | 7/1963 | Parker et al. | 260/85.3 |
| 3,646,166 A | 2/1972 | Canter et al. | 260/879 |
| 3,816,371 A | 6/1974 | Baldwin et al. | 260/79.5 C |
| 3,965,076 A | 6/1976 | Yamauchi et al. | 260/42 |
| 3,965,213 A | 6/1976 | Baldwin et al. | 260/879 |
| 4,208,491 A | 6/1980 | Gardner | 525/254 |
| 4,433,114 A * | 2/1984 | Coran et al. | 525/332.6 |
| 4,446,281 A | 5/1984 | Takamatsu et al. | 525/282 |
| 4,574,140 A | 3/1986 | Sandstrom et al. | 525/123 |
| 5,087,674 A * | 2/1992 | Gardner et al. | 525/356 |
| 5,089,563 A * | 2/1992 | Wideman et al. | 525/332.3 |
| 5,137,981 A * | 8/1992 | Yamada et al. | 525/332.3 |
| 5,200,469 A | 4/1993 | Hous | 525/245 |
| 6,465,581 B1 | 10/2002 | Wideman et al. | 525/332.7 |
| 6,930,153 B2 | 8/2005 | Ashiura | 525/242 |
| 7,241,824 B2 | 7/2007 | Mangeret et al. | 524/264 |
| 2002/0086952 A1 | 7/2002 | Chino et al. | 525/327.6 |

FOREIGN PATENT DOCUMENTS

| | | | | |
|---|---|---|---|---|
| EP | 1398347 A1 | 3/2004 | | C08L 9/06 |
| EP | 1559586 A1 | 8/2005 | | B60C 1/00 |
| EP | 1714984 A1 | 10/2006 | | C08C 19/44 |
| GB | 1257016 | 12/1967 | | C08F 27/00 |

OTHER PUBLICATIONS

European Search Report completed Aug. 13, 2009.

* cited by examiner

*Primary Examiner* — Justin Fischer
(74) *Attorney, Agent, or Firm* — John D. DeLong

(57) ABSTRACT

The present invention is directed to a method of preparing a functionalized elastomer, comprising the steps of
  A) obtaining a diene-based elastomer;
  B) mixing the diene-based elastomer with a halogenating agent to form an intermediate elastomer; and
  C) mixing the intermediate elastomer with a dienophile comprising a filler-active functional group to form a functionalized elastomer.

8 Claims, 32 Drawing Sheets

FUNCTIONALIZED ELASTOMERS

BACKGROUND OF THE INVENTION

Polymer—filler interaction has a profound effect on the physical properties of vulcanisates. This interaction regulates the degree of dispersion of the filler, the formation of an elastomer-filler interface and the filler-filler network. All these ultimately will determine the essential physical properties of the compound such as stress-strain properties, energy loss under cyclic load, abrasion resistance, and tear propagation resistance.

Polymer-filler interaction is predetermined by the properties of the polymer (monomer type, co-monomer sequence distribution and molecular architecture) and the filler (chemical nature, particle size, surface area, aggregate structure and surface activity). Introduction of functional groups to the elastomer is one option to improve polymer-filler interaction. Functionalization is either achieved during the polymerization step by the use of a functional monomer, initiator or terminating agent or by post polymerization functionalization of the elastomer. To the former method a great number of recent examples can be found in the literature albeit they are largely limited to living anionic polymerization. Use of silane coupling agents in conjunction with silica fillers is a well-established example of the post polymerization functionalization method, however, use of silanes can lead to increased compound viscosity during mixing.

There is, therefore, a need for an improved method for post polymerization functionalization of elastomers.

SUMMARY OF THE INVENTION

The present invention is directed to a method of preparing a functionalized elastomer, comprising the steps of
first, obtaining a diene-based elastomer;
second, mixing the diene-based elastomer with a halogenating agent to form an intermediate elastomer; and
third, mixing the first intermediate elastomer with a dienophile comprising a filler-active functional group to form a functionalized elastomer.

BRIEF DESCRIPTION THE DRAWINGS

Figure 1:
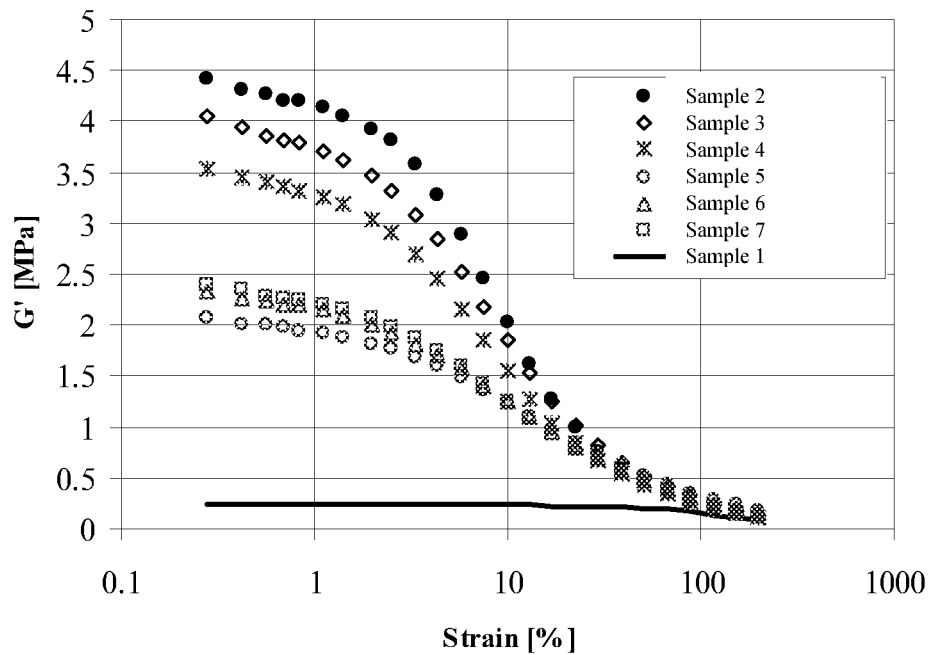
Figure 63:
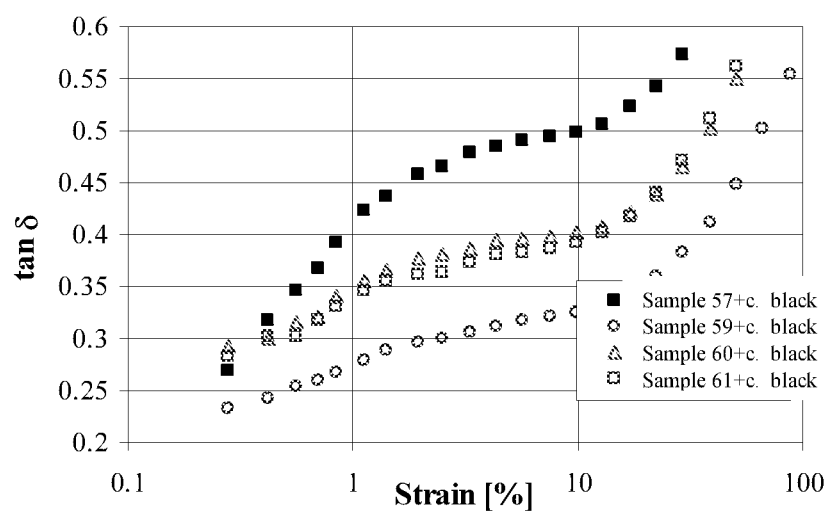

FIGS. 1 through 63 each present data in graphical form illustrating cure and viscoelastic properties of various embodiments of the present invention.

DESCRIPTION OF THE INVENTION

There is disclosed a method of preparing a functionalized elastomer, comprising the steps of
A) obtaining a diene-based elastomer;
B) mixing the diene-based elastomer with a halogenating agent to form an intermediate elastomer; and
C) mixing the intermediate elastomer with a dienophile comprising a filler-active functional group to form a functionalized elastomer.

The functionalization method disclosed herein belongs to the post polymerization functionalization category. It is achieved by the introduction of small amount of conjugated diene in isoprene or butadiene based polymers to facilitate Diels-Alder reaction between the polymer and a dienophile, which carries the functional group capable to strongly interact or react with the filler.

Formation of conjugated dienes and trienes can easily be achieved by the addition of small amounts of iodine or mild brominating agent to isoprene or butadiene based polymers. The reaction scheme leading to the formation of conjugated diene are shown by Scheme 1 and 2. Diels-Alder reaction of N,N'-m-phenylenebismaleamic with a conjugated diene is illustrated by Scheme 2.

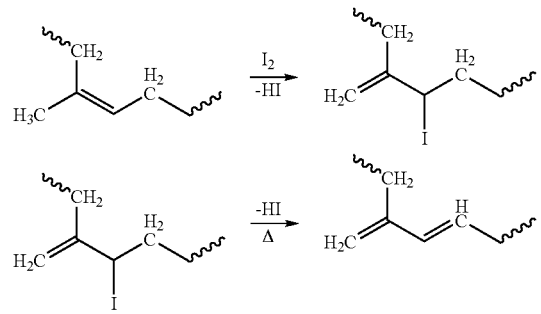

Scheme 1.
Reaction 1,4-IP enchainment with iodine and the decompsition of the allylic iodine.

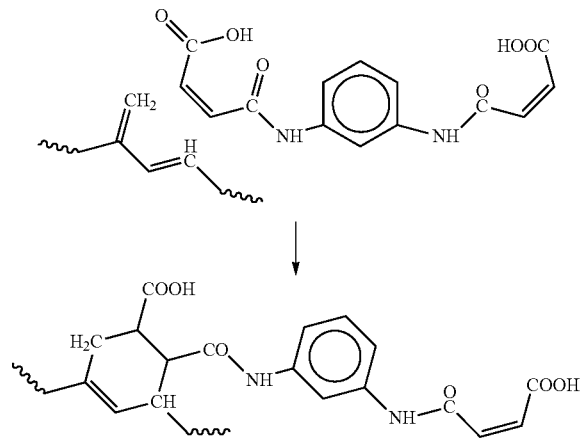

Scheme 2.
Diels-Alder Reaction of
N,N'-m-phenylenebismaleamic acid with conjugated diene.

Elastomers that may be functionalized by the method of the present invention include any diene-based elastomers. The phrases "rubber or elastomer containing olefinic unsaturation" or "diene based elastomer" are used interchangeably and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic diene-based elastomers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred diene-based elastomers that may be functionalized are polyisoprene (natural or synthetic), polybutadiene and SBR, both emulsion (ESBR) and solution (SSBR) polymerized varieties.

In the first step of the method, the diene-based elastomer is mixing with a halogenating agent. Suitable halogenated agents include iodine, bromine, 1,3-dibromo-5,5-dimethyl hydantoin, N-bromosuccinimide and the like. In one embodiment, the halogenating agent is iodine.

In one embodiment, the halogenating agent added to the diene-based elastomer in an amount ranging from about 0.1 to about 2 parts by weight of halogenating agent per 100 parts by weight of diene-based elastomer (phr). In another embodiment, the halogenating agent added to the diene-based elastomer in an amount ranging from about 0.25 to about 1.5 parts by weight of halogenating agent per 100 parts by weight of diene-based elastomer (phr).

The diene based elastomer is mixed with the halogenated in mixing apparatus suitable for mixing rubber, for example, in a Banbury® type mixer, laboratory mixer, rubber mill, extruder, or the like. The elastomer and halogenating agent are mixed starting at a temperature ranging from ambient to about 160° C., preferably from about 30° C. to about 130° C. and even more preferably from about 60° C. to about 100° C. for a period of one to two minutes. Calcium stearate or other suitable acid acceptor may be added to react with halogen by products generated during the reaction. The calcium stearate may be added subsequent to the first mix step, with an additional mixing time of one to two minutes to form an intermediate elastomer, at least part of which comprises a conjugated diene. In one embodiment, the acid acceptor may be added in an amount ranging from 1 to 10 phr. In another embodiment, the acid acceptor may be added in an amount ranging from 2 to 5 phr.

After mixing the diene-based elastomer with the halogenating agent and optionally the acid acceptor, the intermediate elastomer is mixed with a dienophile comprising a filler-active functional group. As defined herein, a dienophile is a compound having ethylenic unsaturation that may react with a conjugated diene in a Diels-Alder reaction. See, for example, J. March, *Advanced Organic Chemistry*, 3rd Ed., John Wiley & Sons (New York) 1985, pp 745-747. Suitable dienophiles are of the forms

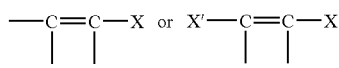

where X and X' are CHO, COOH, COR or COOR wherein R is a C1 to C12 alkyl group, COCl, COAr, CN, NO$_2$, Ar, CH$_2$OH, CH$_2$Cl, CH$_2$NH$_2$, CH$_2$CN, CH$_2$COOH, halogen, or C═C. In the latter case, the dienophile is itself a diene. Most common examples are maleic anhydride, maleic acid, maleamic acid, maleimide and quinones.

As used in the present invention, suitable dienophiles comprise a filler-active functional group. By filler-active functional group, it is meant that the functional group on the dienophile may interact physically or chemically with a filler. The chemical nature of the group is dependent on the type of the filler used.

In the case where silica is the filler, the functional group may be any functional group which is known to interact chemically or physically (hydrogen bonding or polar-polar interaction) with the hydroxyl groups present on the surface of the silica. Examples are saturated or unsaturated cyclic amines like pyrrolidine or pyridine, carboxylic acids, hydroxylamines, amides, imides, alkoxysilane containing structures such as alkyl; aminoalkyl; cycloaminoalkyl; diethylenetriaminoalkyl triethoxy or trimethoxy or methyldiethoxy or methyl dimethoxy silanes.

In the case where carbon black is the filler, the functional group can be any of the above groups which can make a polar-polar interaction or capable to provide a hydrogen bonding with the functional groups present on the surface of the carbon black such as quinones, hydroquinones, carboxylic acids, and lactones. As carbon black can also participate in Diels-Alder reaction (likely via the participation of its fused aromatic rings) the functional group can also be a dienophile.

In one embodiment, the dienophiles comprising a filler-active functional group include but are not limited to bis-maleamic acid, bismaleimide, 1,3-bis(citraconimidomethyl) benzene, maleic anhydride, N,N'-(m-phenylene) bismaleamic acid, N,N'-(m-xylylene)bismaleamic acid; N,N'-(m-phenylene)biscitraconamic acid, N,N'-(m-xylylene)biscitraconamic acid, 3-(triethoxysilyl)propyl N-maleamic acid, and the like.

In one embodiment, the dienophile comprising a filler-active functional group is added to the intermediate elastomer in an amount ranging from about 0.1 to about 2 parts by weight of dienophiles comprising a silica-active functional group per 100 parts by weight of diene-based elastomer (phr). In another embodiment, the dienophile comprising a filler-active functional group added to the intermediate elastomer in an amount ranging from about 0.25 to about 1.5 parts by weight of halogenating agent per 100 parts by weight of diene-based elastomer (phr).

The intermediate elastomer is mixed with the dienophile comprising a filler-active functional group in mixing apparatus suitable for mixing rubber, for example, in a Banbury® type mixer, laboratory mixer, rubber mill, extruder, or the like. The elastomer and halogenating agent are mixed starting at ambient or higher temperature for a period of one to three minutes to obtain the functionalized elastomer.

The functionalized elastomer may then be mixed with various rubber compounding additives as are known in the art, to produce a rubber composition suitable for various applications such as tires, hoses, belts, and the like. In particular, the functionalized elastomer may be mixed with silica or carbon black to obtain tire compounds with improved silica or carbon black interaction.

In addition to the functionalized elastomer, the rubber composition may contain additional diene-based elastomers. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium initiation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

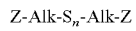

in which Z is selected from the group consisting of

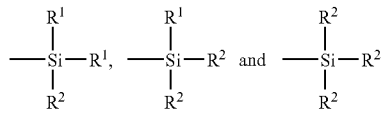

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

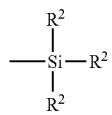

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of a pneumatic tire. For example, the rubber component may be a tread (including tread cap and tread base), sidewall, apex, chafer, chipper, flipper, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLES

For the characterization of polymer-filler interaction in the following examples, two types of dynamic measurements were used. One is the measurement of the Payne effect and the other is the measurement of filler flocculation.

The Payne effect is the nonlinear dynamic mechanical property of elastomers in the presence of filler first studied by Payne, Appl. Polym. Sci., 6, 57 (1962). It is generally associated with the breakdown and agglomeration of filler particles. Filler-matrix interactions are also thought to be contributing factors to the Payne effect. Such processes are the slippage of entanglements between bound rubber and the mobile rubber phase, molecular surface slippage or rearrangement and release of trapped rubber within the filler network. The magnitude of strain dependence of dynamic moduli increases with decreasing molecular weight and strongly reduced by increasing polymer-filler interaction, i.e, by the use of coupling agents. See, e.g., G. Heinrich et al., Advances in Polymer Science, 160, 1436-5030 (2002); S. S. Sternstein et al., Macromolecules, 35, 7262-7273 (2002); Ai-Jun Zhu et al., Composite Science and Technology, 63, 1113-1126 (2003); J. D. Ulmer et al., Rubber Chem. & Techn., 71(4), 637-667 (1998); C. Gauthier et al., Polymer, 45, 2761-2771 (2003). Therefore measurement of Payne effect is highly suitable to quantify polymer-filler interactions.

Flocculation of filler particles after mixing results in a decrease of electric resistance and an increase of compound stiffness or Payne effect. It is thought to be a result of the formation of carbon black agglomerates by the Brownian movement of aggregates assisted by the relaxation of rubber matrix. See, e.g., G. G. Bohm et al., Journal of Applied Polymer Science, 55, 1041-1050 (1995). Alternatively, it is believed to be the result of increasing percolating cluster size due to the formation of polymer bridges between neighboring aggregates. See, e.g., G. A. Schwartz et al., Polymer 44, 7229-7240 (2003). Regardless of the mechanism, increasing polymer-filler interaction should reduce rate of flocculation by restricting aggregate movement and/or formation of additional polymer bridges between aggregates. Filler flocculation can easily be monitored by measuring the increase of compound stiffness (low strain storage modulus) with time at elevated temperature.

Experimental Methods for Examples 1-5

Mixing was carried out using a HaakeBuchler System 40 drive unit equipped with a 75 ml Rheomixer® mixer head. Fill factor was set at 73%.

Polymers were modified using 30° C. as starting temperature. First the rubber was added to the mixer followed by the addition of the halogenating agent at 20 rpm. They were mixed together at 60 rpm for one and a half minutes. Subsequently calcium stearate was added at 20 rpm (30 s) and mixing was continued for an additional one minute at 60 rpm. This was followed by the addition of N,N'-(m-phenylene) bismaleamic acid at 20 rpm (30 s) and a mixing step at 60 rpm lasting for one minute. After sweep, ingredients were mixed for an additional 30 s and the content of the mixer was dumped.

Control containing N,N'-(m-phenylene)bismaleamic acid was made using the exact same procedure except the halogenating agent was not added.

A control was made by putting the rubber through the same mixing process in order to expose the polymer to the same heat and shear history.

Filler was mixed into the polymer using 130° C. starting temperature and by adding the polymer first at 20 rpm followed by the addition of the filler at 20 rpm. The ingredients were mixed at 100 rpm until 170° C. was reached (75-90 s). Subsequently a sweep was carried to allow the temperature to drop followed by a second mix at 60 rpm lasting for 30 s. After that a second sweep and a 30 s final mix at 60 rpm were carried out.

Curatives were added using 100° C. starting temperature. First half of the filler compound was added followed by the curatives and the other half of the filler compound at 20 rpm rotor speed. The ingredients were mixed at 60 rpm until 120° C. was reached (90 s). At this point a sweep was carried out followed by a second mix cycle lasting for about 30 s. As temperature reached 120° C. the content of the mixer was dumped.

All mixes were refined on a warm mill using ⅛" gap.

Rheological measurements were done using the Alpha Technology RPA 2000 instrument. Filler flocculation measurements were done at 160° C. using 0.7 strain and 1.667 Hz. Strain sweeps were conducted at 40° C. at 1 Hz frequency. Strain was varied from 0.28% to 200%.

Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 wt % solution of polymer in THF through a 0.45 μm filter prior to injection. Data was processed using the ASTRA software of Wyatt Technology.

Example 1

In this example, the effect of modifying a synthetic polyisoprene with iodine and a dienophile is illustrated. First a set of modified synthetic polyisoprene (Natsyn 2200) samples was made using iodine and N,N'-(m-phenylene)bismaleamic acid. Iodine, calcium stearate ($CaSt_2$) and N,N'-(m-phenylene)bismaleamic acid were used in equimolar amounts. Maximum amount of functional group per polymer chain (assuming 100% conversion) and the addition level of chemicals is listed in Table 1. Calcium stearate was added as an acid mop to tie down the HI evolving during the iodination and dehydroiodination reactions.

TABLE 1

| Sample No. | Modification Level [unit/chain] | $I_2$ [mmol/kg] | $CaSt_2$ [phr] | MPBMA[1] [phr] |
|---|---|---|---|---|
| 1 | none | 0 | 0 | 0 |
| 2 | none | 0 | 0 | 0 |
| 3 | 8 | 17 | 0 | 1.207 | 0.508 |
| 4 | 2 | 4 | 0.106 | 0.302 | 0.127 |
| 5 | 4 | 8 | 0.212 | 0.603 | 0.254 |
| 6 | 8 | 17 | 0.424 | 1.207 | 0.508 |
| 7 | 16 | 33 | 0.848 | 2.414 | 1.015 |

[1]N,N'-(m-phenylene) bismaleamic acid

Sample 1 was the raw polyisoprene. Two control samples were also made for comparison purposes. One control (Sample 2) was made by subjecting it to the same shear in the mixer as the rest of the modified samples. An additional control (Sample 3) was made by adding 17 mmol/kg N,N'-(m-phenylene)bismaleamic acid and $CaSt_2$ to the sample.

SEC measurements revealed that the polyisoprene broke down during the modification. According to Table 2 the molecular weight progressively decreases as the $I_2$—N,N'-(m-phenylene)bismaleamic acid concentration increased. Break down is likely due to the use of elementary iodine in the mixer. The chemical degradation could potentially avoided by the use of milder halogenating agents or dispersing iodine in an oil and adding the mixture to carbon black for easy handling. According to the results the shearing of the samples also resulted in substantial molecular weight decrease. Addition of N,N'-(m-phenylene)bismaleamic acid alone had no apparent effect on the molecular weight indicating the absence of any chemical reaction between the unmodified polyisoprene and the bifunctional additive at the temperature of the modification.

TABLE 2

| Sample No. | $M_n$ [kDalton] | $M_w$ [kDalton] | $M_z$ [kDalton] | $M_w/M_n$ | $M_z/M_w$ |
|---|---|---|---|---|---|
| 1 | 462 | 1212 | 2480 | 2.62 | 2.05 |
| 2 | 446 | 835 | 1463 | 1.87 | 1.75 |
| 3 | 435 | 868 | 1543 | 2.00 | 1.78 |
| 4 | 374 | 704 | 1294 | 1.88 | 1.84 |
| 5 | 259 | 507 | 1010 | 1.96 | 1.99 |
| 6 | 242 | 459 | 967 | 1.90 | 2.11 |
| 7 | 380 | 750 | 1364 | 1.97 | 1.82 |

Example 2

Figure 2:
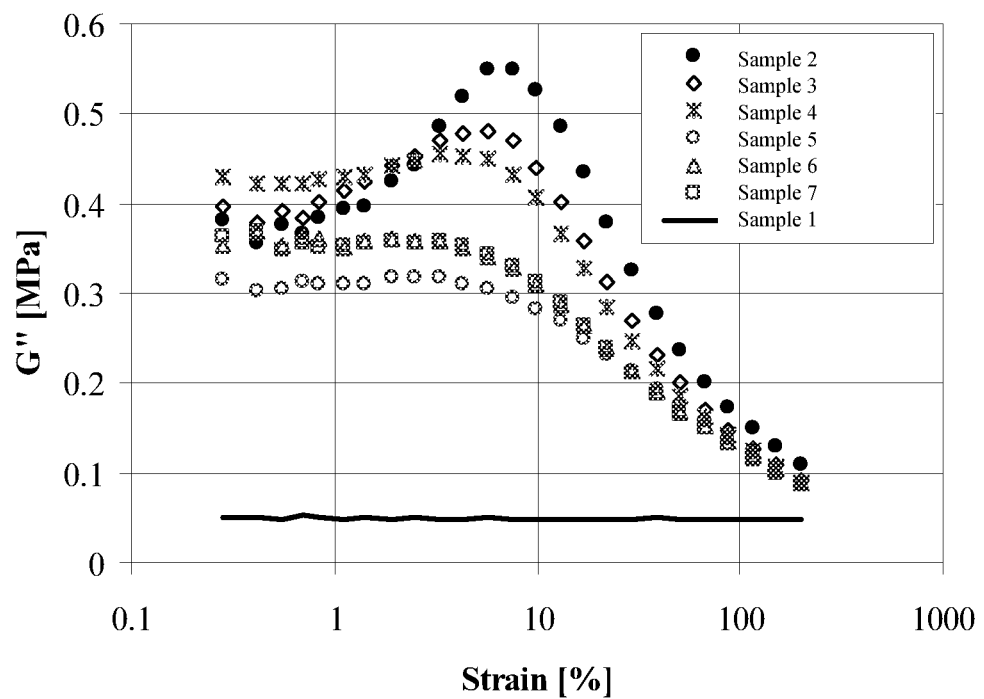

In this example, effect of mixing a dienophile-modified polyisoprene with silica is illustrated. The samples of Example 1 were mixed with 40 phr silica (Zeosil Z1165 MP) according to the mixing procedure described in the experimental section. Payne effect was measured after 16 minutes 160° C. thermal relaxation treatment of all samples in order to allow the samples to reach a condition closer to equilibrium. This was necessary as a small mixer was used in which the shear forces could be significantly greater than in a larger one. The results of the strain sweeps are shown by FIGS. 1 and 2. Results of strain sweep conducted on the raw polymer (sheared down polyisoprene) were included in the figures in order to emphasis the contribution of filler to the measured G' and G" values.

Referring now to FIGS. 1 and 2, G' and G" of the control sample shows the largest variation with strain, i.e, the most significant Payne effect. Addition of N,N'-(m-phenylene)bismaleamic acid resulted in some decrease in strain dependence apparently due to the ability of N,N'-(m-phenylene)bismaleamic acid to coat the surface of silica and decrease its hydrophylicity to a degree. The significantly lower G' and G" values of the iodine treated samples imply that chemical bonding of N,N'-(m-phenylene)bismaleamic acid to the polymer was achieved. The low strain G' displays a decrease with increasing $I_2$—N,N'-(m-phenylene)bismaleamic acid concentration and it appears to reach a low plateau value at or over 4 units/chain theoretical maximum functional group content. At the same time G" peak is also decreasing with increasing level of modification and reaches and optimum low level at about the same functional group concentration.

Figure 3:
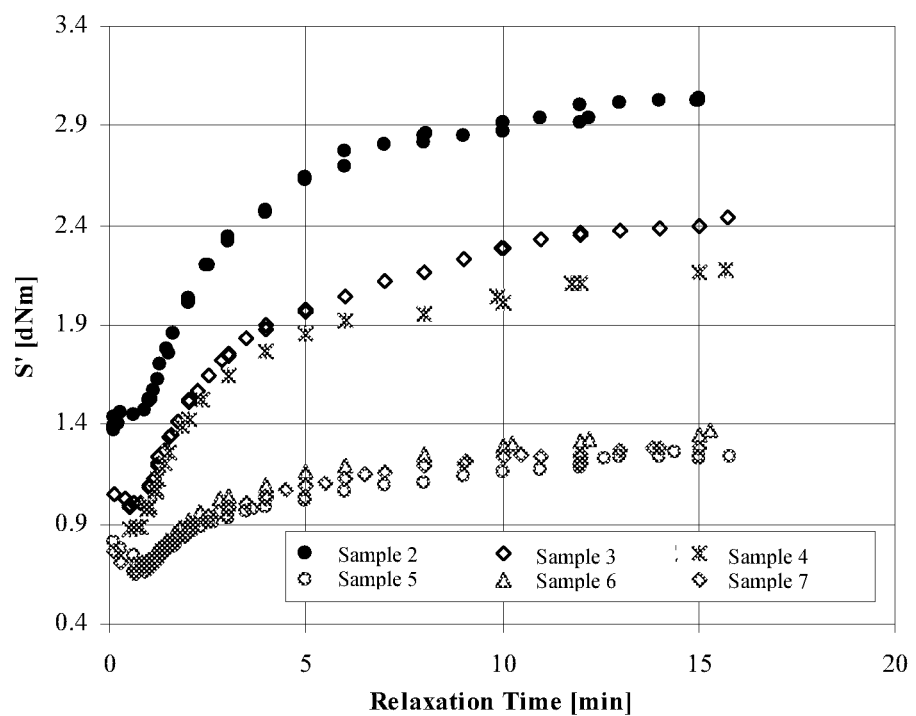

Filler flocculation measurements further indicate these results. FIG. 3 depicts the increase of low strain (0.7%) storage modulus of the samples heated to 160° C. The increase of S' with time is not due to chemical crosslinking as these samples contained no curatives. In addition, the control sample shows the highest S' increase and this sample contained nothing else but the silica filler.

According to the results, filler flocculation was also retarded by the addition of N,N'-(m-phenylene)bismaleamic acid to a degree. However, substantially stronger retardation was achieved as N,N'-(m-phenylene)bismaleamic acid was chemically bonded to the polymer. Apparently 4/chain theoretical maximum functional group content was sufficient to achieve maximum retardation of filler and chain movements.

Example 3

In this example, the effect of mixing a dieneophile-modified polyisoprene is further illustrated. A set of polyisoprene samples was prepared following the methods of Example 1 using a theoretical maximum of 0, 4, 8, and 16 functional group per chain (Samples 8 through 11, respectively) in order to study the dynamic properties of cured samples. The theoretical maximum functional group per chain is based on full conversion of both reactions (formation of conjugated diene and the Diels-Alder reaction) as well as on the molecular weight of the virgin polymer. The actual bound N,N'-(m-phenylene)bismaleamic acid content of samples should be quite lower due to the degradation of polymer chain during modification and lower than 100% conversion of the individual reaction steps.

Subsequently 50 phr silica and 4 phr GPT black was added to the modified samples (Samples 9 through 11) and the control (Sample 8) following the methods of Example 2. The samples were compounded with curatives in a productive mixing step. Table 3 summarizes the simplified cure package used.

TABLE 3

| Curative | phr |
| --- | --- |
| Stearic Acid | 2 |
| Zinc Oxide | 3 |
| CBS[1] | 1.6 |
| Sulfur | 2 |

[1]N-Cyclohexyl-2-benzothiazole sulfenamide

Figure 4:
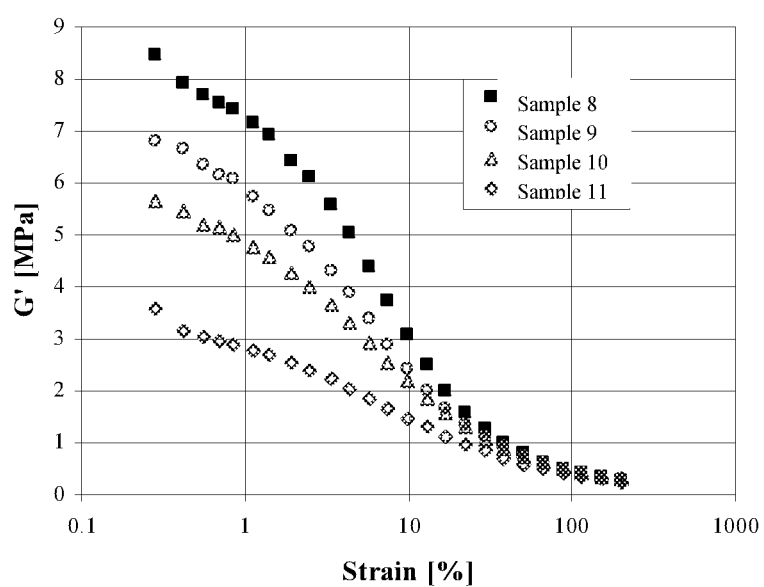
Figure 5:
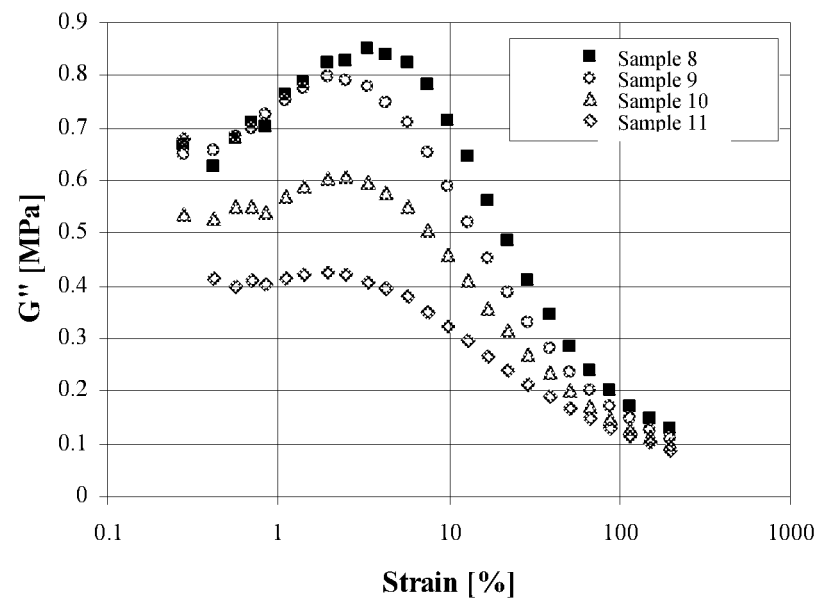

Samples were cured at 160° C. for 16 minutes. Strain sweeps of the cured samples were measured at 40° C. FIGS. 4 and 5 illustrate the reduction of strain dependence of G' and G" (Payne effect) by the $I_2$—N,N'-(m-phenylene)bismaleamic acid modification.

As shown in FIGS. 4 and 5, low strain G' decreases by a factor of three and G" maximum shows a 50% decrease with increasing level of functionalization. Contrary to the results obtained with unfilled polymers, decrease of G' and G" is progressive with increasing level of modification. It does not seem to reach a plateau.

Example 4

In this example, the effect of using of 1,3-dibromo-5,5-dimethyl hydantoin (hydantoin) to halogenate a synthetic polyisoprene before reaction with a dienophile is illustrated. Hydantoin can liberate two moles of bromine by reacting with the byproduct, HBr, released in the bromination step of isoprene units. Therefore according to the stochiometry one-half of the molar amount should be sufficient. Nevertheless some excess of it was used, as the reaction is not expected to go to completion. The molar amounts of chemicals used in the next experiments are listed in Table 4. In these experiments $CaSt_2$ was not added as the amine groups of N,N'-(m-phenylene) bismaleamic acid and hydantoin should be sufficient to react with the HBr evolving during the dehydrobromination of the allylic bromide.

The modification of polymers and the shearing of the control were carried out in a 300 cm³ Rheomix® 3000E mixer head attached to a Haake Buchler HBI System 90 drive unit. The starting temperature was 90° C. First the polymer was added followed by the hydantoin at 20 rpm. These were mixed for 2 minutes at 60 rpm rotor speed. Next N,N'-(m-phenylene)bismaleamic acid was added at 20 rpm and they were mixed for an additional 3 minutes.

TABLE 4

| Sample No. | Modification Level [unit/polym. chain] | Hydantoin [mmol/kg] | Hydantoin [phr] | MPBMA[1] [mmol/kg] | MPBMA[1] [phr] |
| --- | --- | --- | --- | --- | --- |
| 12 | 0 | 0 | 0 | 0 | 0 |
| 13 | 16 | 0 | 0 | 33.4 | 1.02 |
| 14 | 16 | 20 | 0.57 | 33.4 | 1.02 |
| 15 | 16 | 40 | 1.14 | 33.4 | 1.02 |

[1]N,N'-(m-phenylene) bismaleamic acid

Table 5 lists the molecular weight of the polymers before and after modification. The molecular weights of Sample 12, sheared polyisoprene and Sample 13, polyisoprene mixed with N,N'-(m-phenylene)bismaleamic acid alone, have very similar molecular weights indicating that N,N'-(m-phenylene)bismaleamic acid in the absence of conjugated diene does not react with the polymer at the temperature of the mixing. The molecular weight of Sample 14 modified with 20 mmol/kg hydantoin and 33 mmol/kg N,N'-(m-phenylene)bismaleamic acid is also similar to the sheared control indicating no cross-linking reaction taking place. Sample 15 modified by 40 mmol/kg hydantoin shows some molecular weight decrease due to chemical chain degradation.

TABLE 5

| Sample No. | Hydantoin [mmol/kg] | $M_n$ [kDalton] | $M_w$ [kDalton] | $M_z$ [KDalton] |
| --- | --- | --- | --- | --- |
| 12 | 0 | 553 | 1071 | 1991 |
| 13 | 0 | 585 | 1095 | 2026 |
| 14 | 20 | 455 | 915 | 2023 |
| 15 | 40 | 330 | 668 | 1550 |

Figure 6:
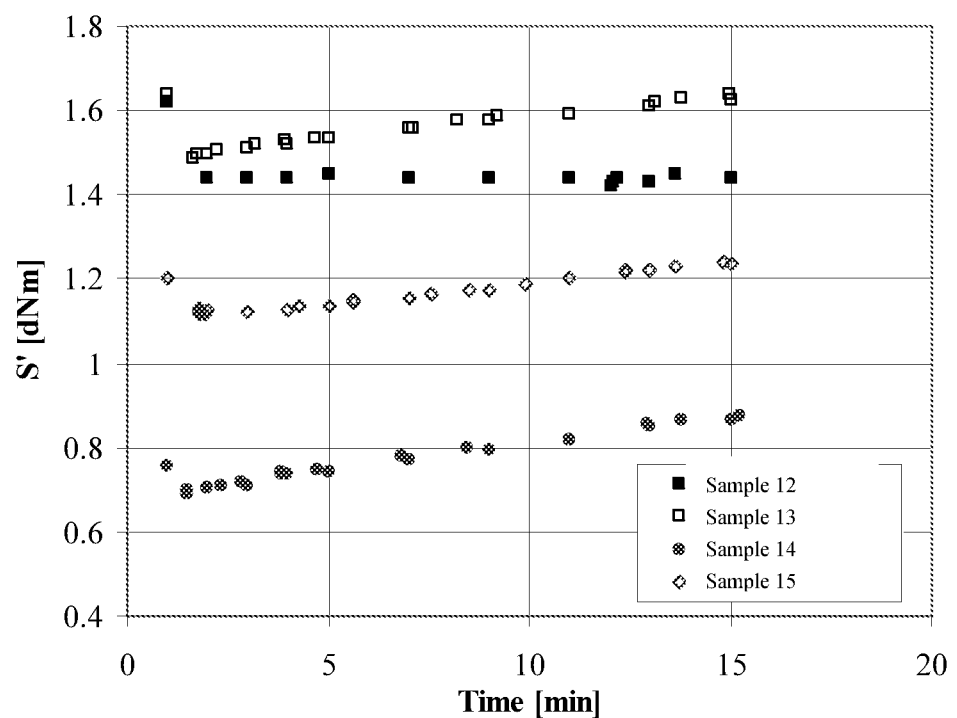

Cure activity of the controls and modified polymers was tested using the RPA in order to gain some information about the reaction between the polymer and the bifunctional N,N'-(m-phenylene)bismaleamic acid at higher temperatures. Measurements were done at 160° C. using 7% strain and 1.67 Hz. FIG. 6 shows the results. The sheared polyisoprene (Sample 12) shows no change of S' with time. The modified polymers show some increase of S' indicating coupling between polymer chains via N,N'-(m-phenylene)bismaleamic acid. Slope of the torque increase was measured about 50% higher for the sample modified with the higher concentration of hydantoin. This suggests that the reaction is taking place via the conjugated diene formed by the bromination and subsequent dehydrobromination of the isoprene units.

The torque increase is quite small, likely due to the fact that the functional groups are in large excess over the forming conjugated dienes. Sample 13 modified with N,N'-(m-phenylene)bismaleamic acid only also shows some marginal torque increase.

Example 5

In this example, the effect of mixing the modified polyisoprene of Example 4 with silica is illustrated. The samples of Example 4 were compounded with 50 phr silica. In addition to the silica, 4 phr GPT black and 20 phr naphthenic oil was also added to the polymers. Mixing was done in a 75 cm³ mixer using 73% fill factor, 60 rpm rotor speed and 130° C. as starting temperature. The mixing was carried out as follows. First the rubber was added followed by the addition of filler at 20 rpm. Adding the filler took one minute. After all filler was added, the rotor speed was increased to 60 rpm and mixing was continued for 1.5 minutes. During this period, temperature increased from 130° C. to about 150° C. After the first mixing step a sweep was carried out and it was followed by a second mixing step at 60 rpm lasting for 1 minute. Typical dump temperature was 160° C.

Figure 7:
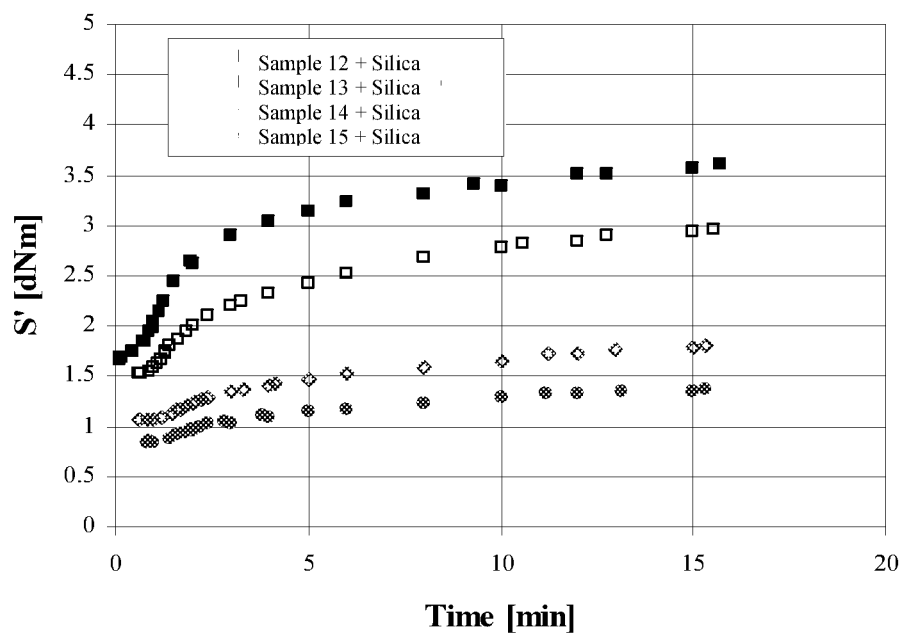

The ability of the modified polymers to retard silica flocculation at 160° C. is illustrated by FIG. 7. Increase of S' is about 0.8-0.5 dNm in case of the modified polymers. In contrast, S' of the sheared polyisoprene control sample increases by about 3.5 dNm. N,N'-(m-phenylene)bismaleamic acid control also shows some retardation of the filler flocculation, however significantly less then the samples modified with hydantoin. The S' increase in case of the N,N'-(m-phenylene)bismaleamic acid control is about 1.5 dNm.

Figure 8:
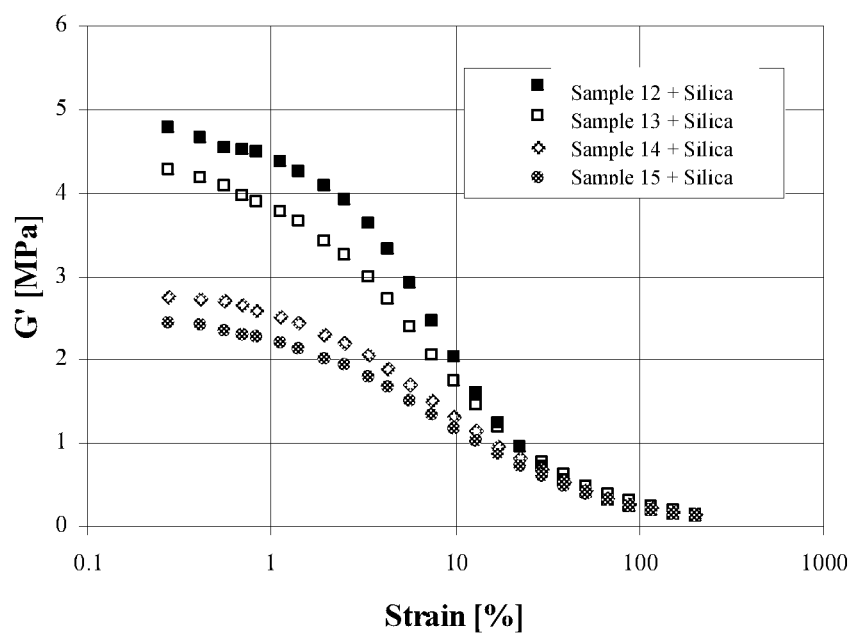
Figure 9:
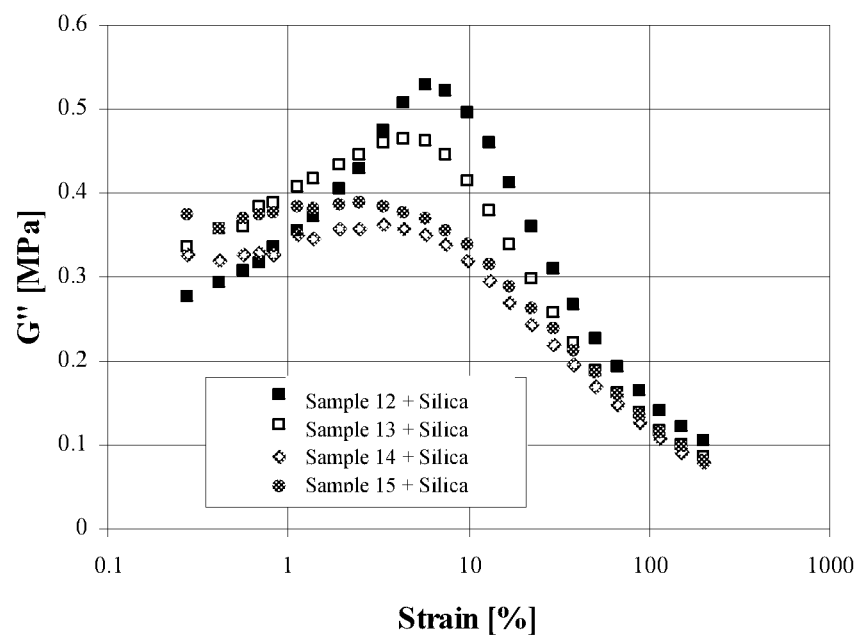

FIGS. 8 and 9 show the results of the strain sweeps conducted at 40° C. measured after the 16 minute 160° C. heat treatment of the samples. Similarly to the $I_2$—N,N'-(m-phenylene)bismaleamic acid system, hydantoin-N,N'-(m-phenylene)bismaleamic acid modification results in a significant reduction of G' and G" at low frequencies indicating a strong interaction between the silica and the polymer bound maleamic acid functional groups. The need for the formation of conjugated diene via bromination is underlined by the higher G' plateau and G" maximum of the sample modified with N,N'-(m-phenylene)bismaleamic acid alone.

These results suggest that interaction of the natural rubber with silica can be strongly enhanced by chemically binding small amounts of N,N'-m-phenylene-bis-maleamicacid (N,N'-(m-phenylene)bismaleamic acid) to the polymer. This may be achieved by the formation of conjugated diene in natural rubber via the addition of iodine or 1,3-dibromo-5,5-dimethyl hydantoin to the polymer to form conjugated diene along the chain and subsequently reacting the diene segments with N,N'-m-phenylenebismaleamic acid (N,N'-(m-phenylene)bismaleamic acid) in the mixer. The modified polymers filled with silica displayed a significantly reduced Payne effect and a strongly impeded filler flocculation in both uncured and cured state. These results imply improved filler polymer interaction, which ultimately believed to lead to improved rolling resistance and wear properties of the tire.

Experimental Methods for Examples 6 Through 9

The modification of polymers and the shearing of the controls were carried out in a 300 cm$^3$ Rheomix® 3000E mixer head attached to a Haake Buchler HBI System 90 drive unit. The starting temperature was 60° C. First the polymer was added followed by the iodine flakes at 20 rpm. These were mixed for 2 minutes at 60 rpm rotor speed. Next N,N'-(m-phenylene)bismaleamic acid was added at 20 rpm and they were mixed for an additional 3 minutes at 60 rpm.

Addition of fillers and oil (50 phr silica, 4 phr black and 20 phr oil) was done using a HaakeBuchler System 40 drive unit equipped with a 75 ml Rheomixer® mixer head. Fill factor was set at 73%. Mixing was carried out using 60 rpm rotor speed and 130° C. as starting temperature. First the rubber was added followed by the addition of fillers mixed with the oil. The rotor speed was 20 rpm during the step and it took about one minute. Next the rotor speed was increased to 60 rpm and mixing was continued for 1.5 minutes. During this period, temperature increased from about 130° C. to about 150° C. After the first mixing step a sweep was carried out and it was followed by a second mixing step at 60 rpm lasting for 1 minute. Typical dump temperature was 160° C.

All mixes were refined on a warm mill using ⅛" gap.

Rheological measurements were done using the Alpha Technology RPA 2000. Filler flocculation measurements were done at 160° C. using 0.7 strain and 1.667 Hz. Strain sweeps were conducted at 40° C. at 1 Hz frequency. Strain was varied from 0.28% to 200%.

Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 wt % solution of polymer in THF through a 0.45 µm filter prior to injection. Data was processed using the ASTRA software of Wyatt Technology.

Example 6

In this example, the effect of modifying a solution polymerized styrene-butadiene rubber with a dieneophile is illustrated. A set of samples were made by adding first iodine and than N,N'-m-phenylene-bis-maleamic acid to a solution polymerized styrene-butadiene rubber (SSBR) in a mixer. Mixing conditions are described in the experimental section. The molar amounts of chemicals used for the functionalization of SSBR are listed in Table 6. Three control samples 16-18 were also made for comparison purposes. Sample 16 was the raw SSBR. Sample 17 was made by subjecting the polymer to the same shear in the mixer as the rest of the modified samples were exposed to. Sample 18 was made by adding N,N'-(m-phenylene)bismaleamic acid only (60 mmol/kg) to SSBR.

TABLE 6

| Sample No. | Iodine | | MPBMA[1] | |
|---|---|---|---|---|
| | [mmol/kg] | [phr] | [mmol/kg] | [phr] |
| 16 | 0 | 0 | 0 | 0 |
| 17 | 0 | 0 | 0 | 0 |
| 18 | 0 | 0 | 60 | 1.82 |
| 19 | 10 | 0.25 | 10 | 0.3 |
| 20 | 20 | 0.51 | 20 | 0.61 |
| 21 | 30 | 0.76 | 30 | 0.91 |
| 22 | 40 | 1.02 | 40 | 1.22 |
| 23 | 60 | 1.52 | 60 | 1.82 |

[1]N,N'-(m-phenylene) bismaleamic acid

Table 7 lists the molecular weight of polymers before and after modification. The molecular weight averages of the sheared control Sample 17 and the virgin material Sample 16 are very similar indicating the absence of shear degradation. Control Sample 18 made with N,N'-(m-phenylene)bismaleamic acid is also similar to these suggesting that there is no Ene reaction taking place between the bifunctional additive and the polymer at the temperature of the modification. The Alder-Ene reaction requires higher temperatures because of the higher activation energy and stereoelectronic requirement of breaking the allylic C—H σ-bond.

TABLE 7

| Sample No. | $M_n$ [kDalton] | $M_w$ [kDalton] | $M_z$ [kDalton] | $M_w/M_n$ | $M_z/M_w$ |
|---|---|---|---|---|---|
| 16 | 151 | 260 | 430 | 1.72 | 1.66 |
| 17 | 156 | 261 | 443 | 1.67 | 1.70 |
| 18 | 149 | 256 | 430 | 1.68 | 1.69 |
| 19 | 148 | 271 | 504 | 1.83 | 1.86 |
| 20 | 155 | 279 | 513 | 1.80 | 1.84 |
| 21 | 160 | 287 | 559 | 1.79 | 1.95 |
| 22 | 241 | 476 | 1225 | 1.98 | 2.57 |
| 23 | 283 | 501 | 1106 | 1.77 | 2.21 |

In contrast, the samples treated with iodine prior to the addition of N,N'-(m-phenylene)bismaleamic acid have higher molecular weight averages than the control suggesting the formation of conjugated diene and the subsequent Diels-Alder reaction with the dienophile. Molecular weight averages also increased with the increasing concentration of the additives. As N,N'-(m-phenylene)bismaleamic acid carries two dienophile groups, molecular weight increase could be the result of the reaction of this additive on both sides with conjugated diene. Reaction of two conjugated diene structures is also possible because the conjugated diene itself could be a dienophile in the Diels-Alder reaction. Alternatively, Diels-Alder reaction of a conjugated structure and a 1,4 or 1,2 butadiene enchainment is also possible. Molecular weight increase could have a negative impact on the processability of SSBR as this material is already branched with DVB and has a high Mooney (70+/−6). However, in case of more linear SBRs, introduction of some branching could be beneficial and lead to the improvement of tear properties. Further increasing the access of maleamic acid groups over the conjugated dienes can also reduce the extent of crosslinking. In case of the above samples the molar ratio of maleamic acid groups and conjugated dienes is 2:1 assuming 100% conversion of the iodine reaction. Crosslinking can also be prevented by the use of monofunctional dienophile such as maleamic acid.

Figure 10:
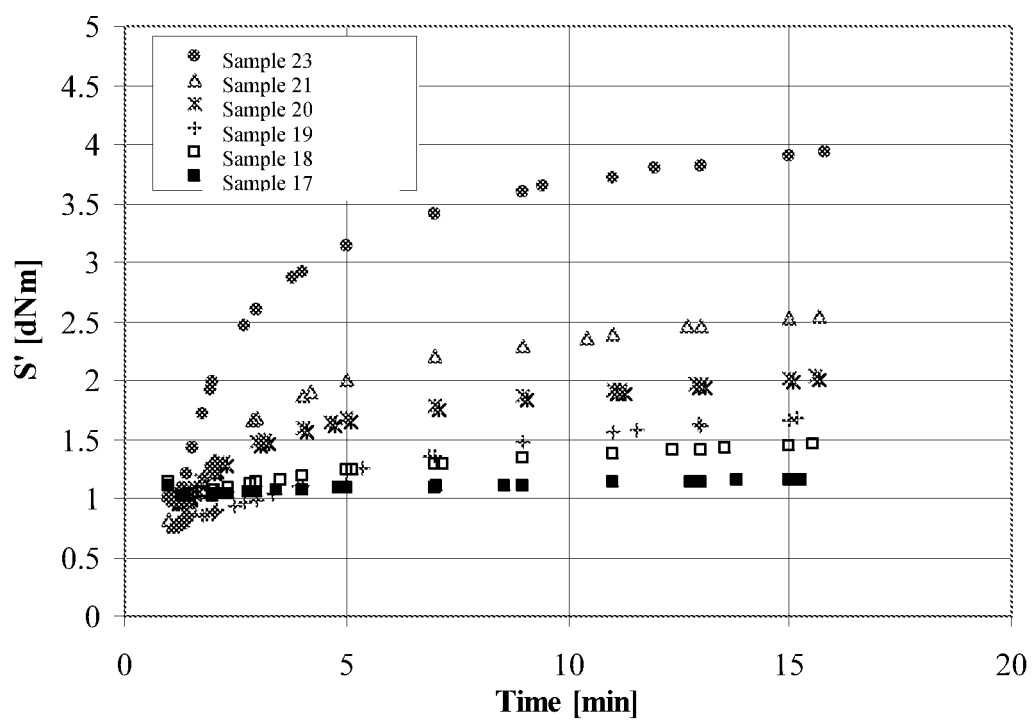

At cure temperature crosslinking of modified samples continued according to the RPA measurements captured by FIG. 10. Measurements were carried out using standard conditions, 1.667 Hz and 7% strain at 160° C.

According to the results shown in FIG. 10, torque increase in the sheared control and the sample containing N,N'-(m-phenylene)bismaleamic acid is minimal. Sample modified with 10 mmol/kg $I_2$ and N,N'-(m-phenylene)bismaleamic acid has higher torque increase and it is progressively increasing with increasing concentrations of additives. These results are in perfect agreement with the molecular weight measurements.

Example 7

Figure 11:
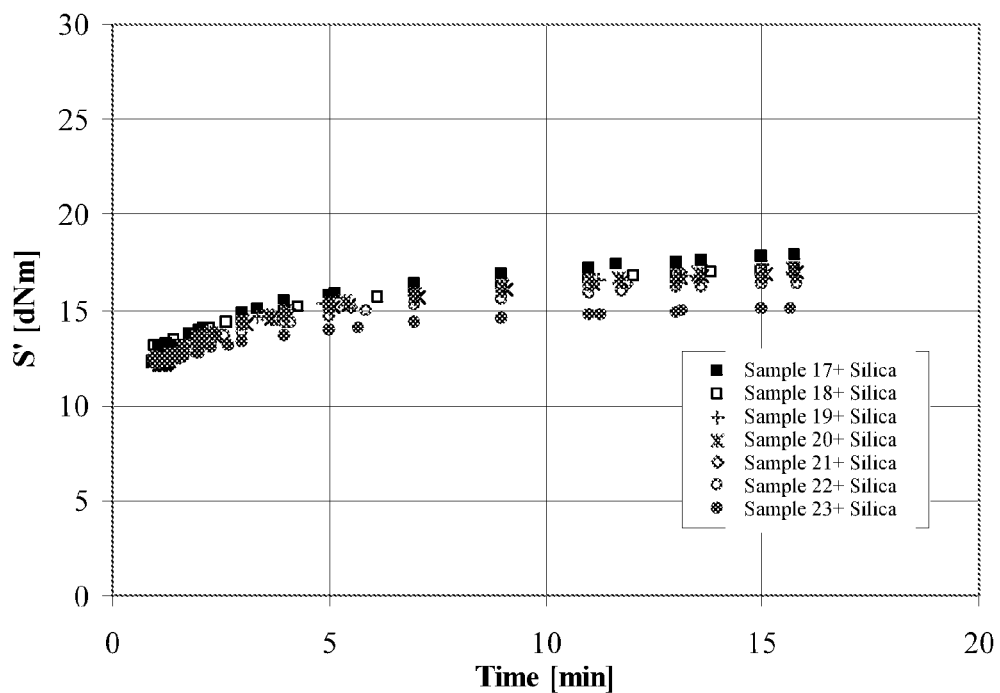

In this example, the effect of mixing silica with the modified SSBR of Example 6 is illustrated. Although the above results imply that the modified samples could scorch during mixing the samples with silica, it did not happen. The compounds filled with silica (50 phr) and oil (20 phr) showed no significant cure activity. FIG. 11 displays the registered cure curves of the filled compounds. According to the results shown in FIG. 11, torque increase of samples reversed compared to the ranking of the raw polymers. The highest torque increase is shown by the control, which contained only the silica and the oil. This torque increase is due to the flocculation of the silica. Torque increase in the modified samples was less and it decreased with increasing level of modification indicating the ability of the modified polymer to retard silica flocculation. This diminished cure activity of the filled and modified samples implies that the maleamic acid groups were effectively extracted out from the polymer matrix by silica suggesting the ability of N,N'-(m-phenylene)bismaleamic acid to interact with the filler.

Figure 12:
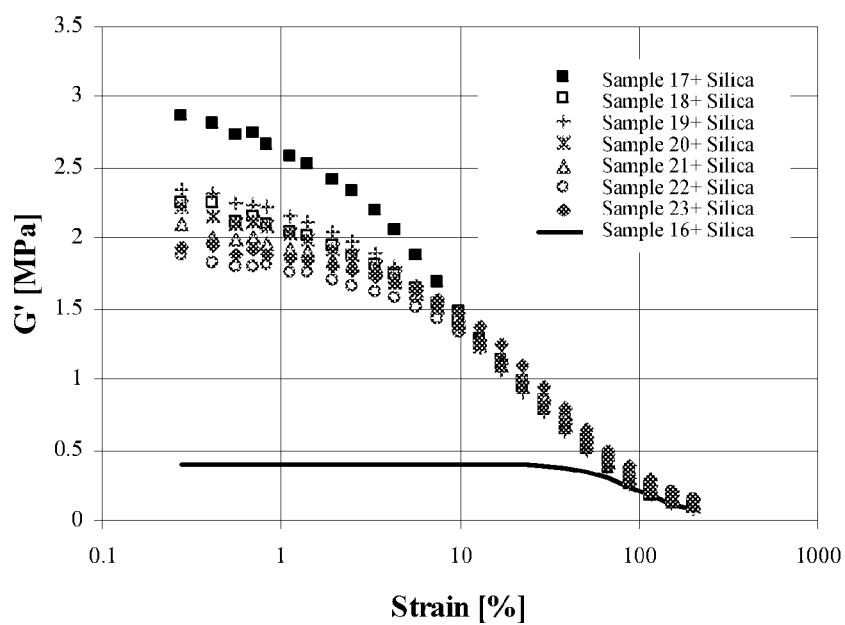
Figure 13:
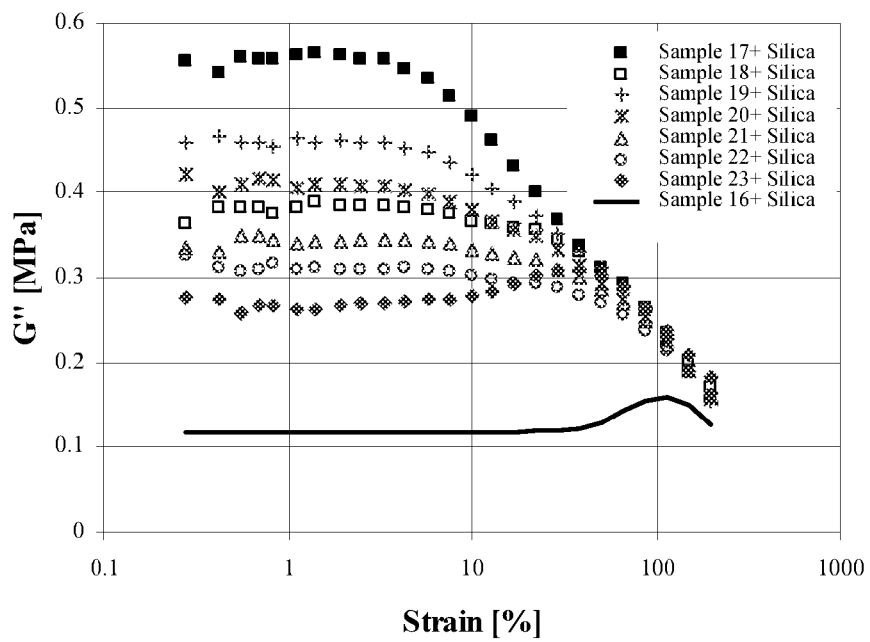

The samples, compounded with filler and oil as described in the experimental section, first were tested as is, i.e., without thermal relaxation. RPA measurements were carried out at 40° C. Strain sweeps were conducted after 16 minutes conditioning of the sample in the die at 40° C., 1 Hz and 0.28% strain. FIG. 12 shows the strain dependence of the elastic modulus. The highest strain dependence is displayed by the control. Upon modification it is reduced and there is a further decrease with increasing level of modification. The impact on the loss modulus is more pronounced (see FIG. 13). The low strain value loss modulus progressively decreases with increasing concentration of the additives and at 60 mmol/kg concentration of iodine and N,N'-(m-phenylene)bismaleamic acid it is about 50% less than that of the control. The control sample modified with the same amount of N,N'-(m-phenylene)bismaleamic acid (60 mmol/kg) also shows reduced G' and G" however the degree of improvement is less pronounced.

Figure 14:
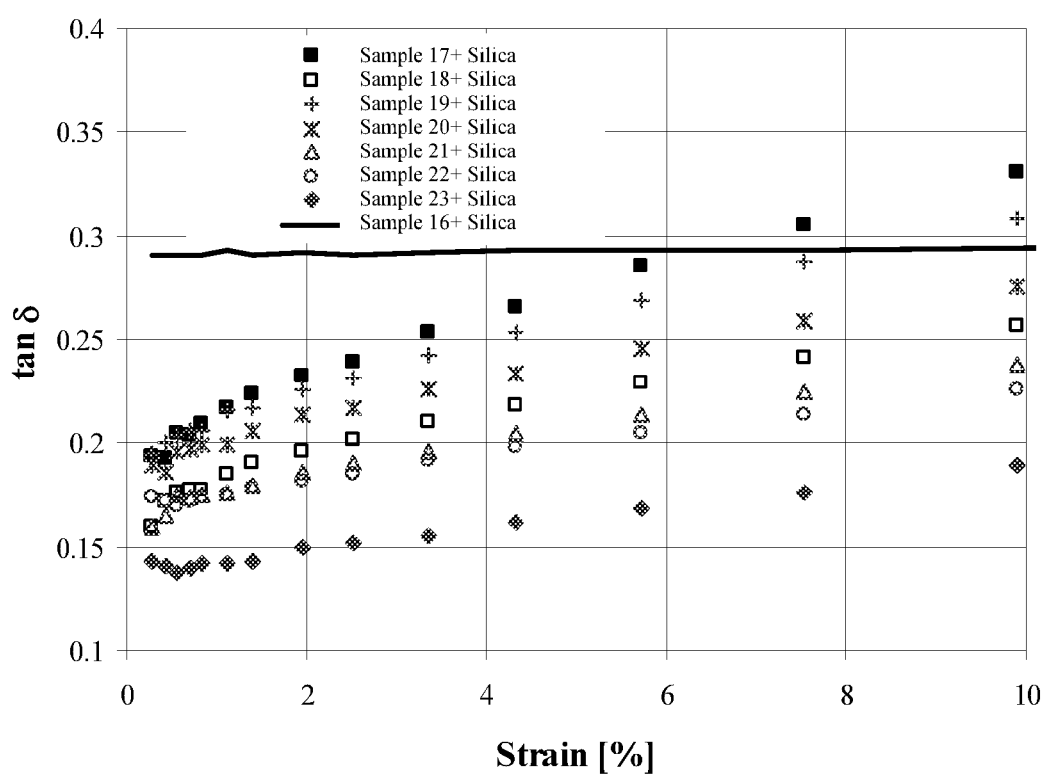

As a result of the strong decrease of the loss modulus the phase angle is also reduced as shown in FIG. 14. This is important as the tan δ at about 5% strain is considered to be a good predictor of the rolling resistance.

Figure 15:
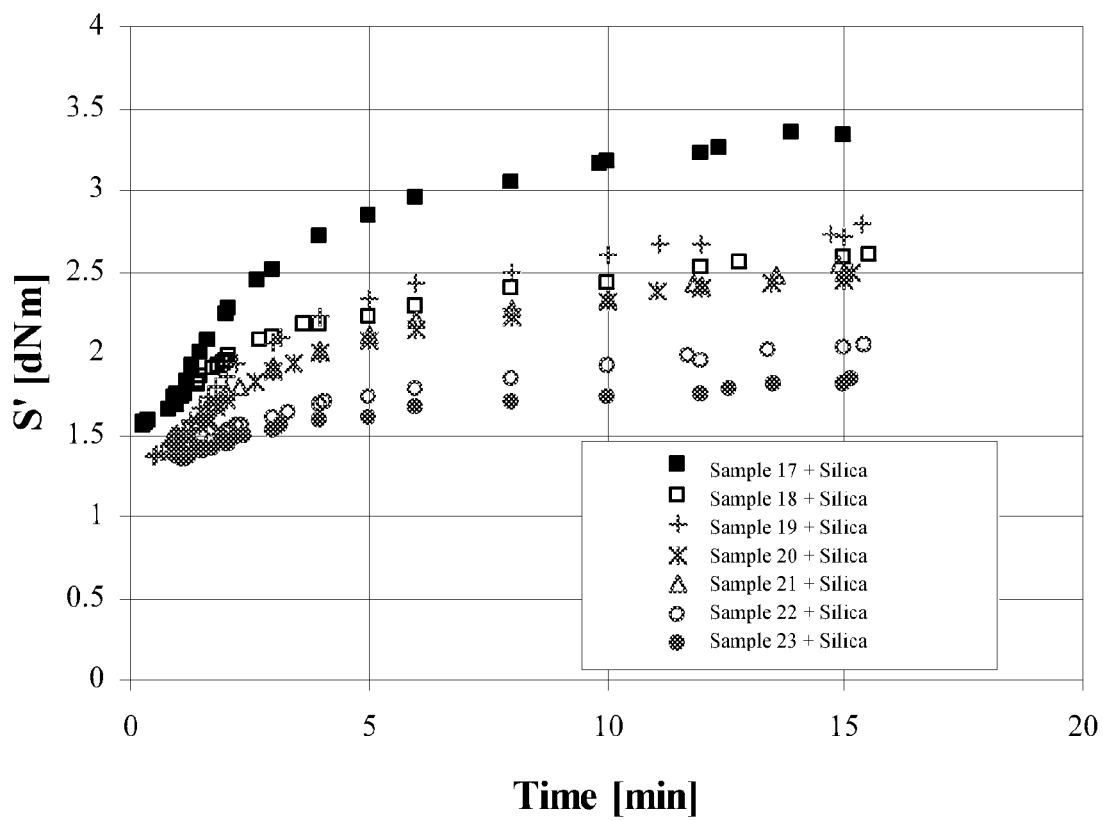

The ability of the modified polymers to retard silica flocculation at 160° C. is illustrated by FIG. 15. The increase of compound stiffness is thought to be a result of the formation of filler agglomerates by the Brownian movement of aggregates assisted by the relaxation of rubber matrix. Alternatively, it is believed to be the result of increasing percolating cluster size due to the formation of polymer bridges between neighboring aggregates. According to the results shown in FIG. 15, S' more than doubles during the 16 minutes heat treatment of the control sample. Increase of S' is reduced in the modified samples and its magnitude is reversibly proportional to the concentration of the additives. N,N'-(m-phenylene)bismaleamic acid alone also retarded the increase of compound stiffness over time. However, at the same concentration level (60 mmol/kg), the iodine-modified sample shows significantly lower increase of S' suggesting that the functional groups are chemically bonded to the polymer.

Figure 16:
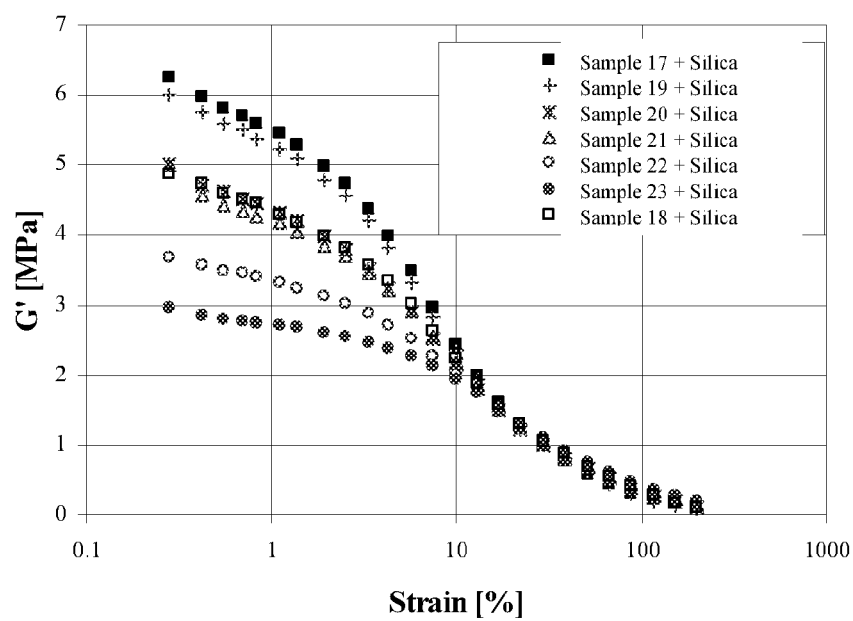
Figure 17:
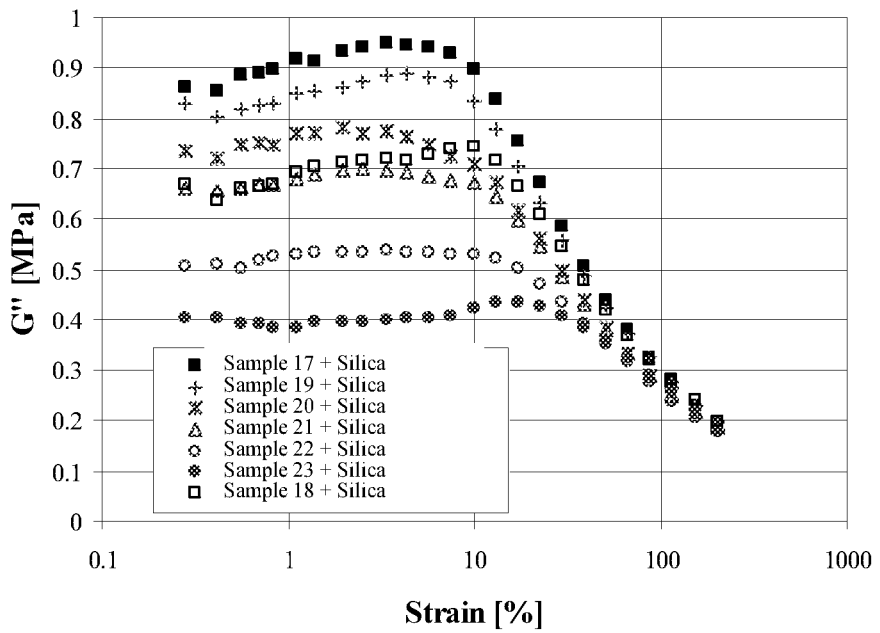
Figure 18:
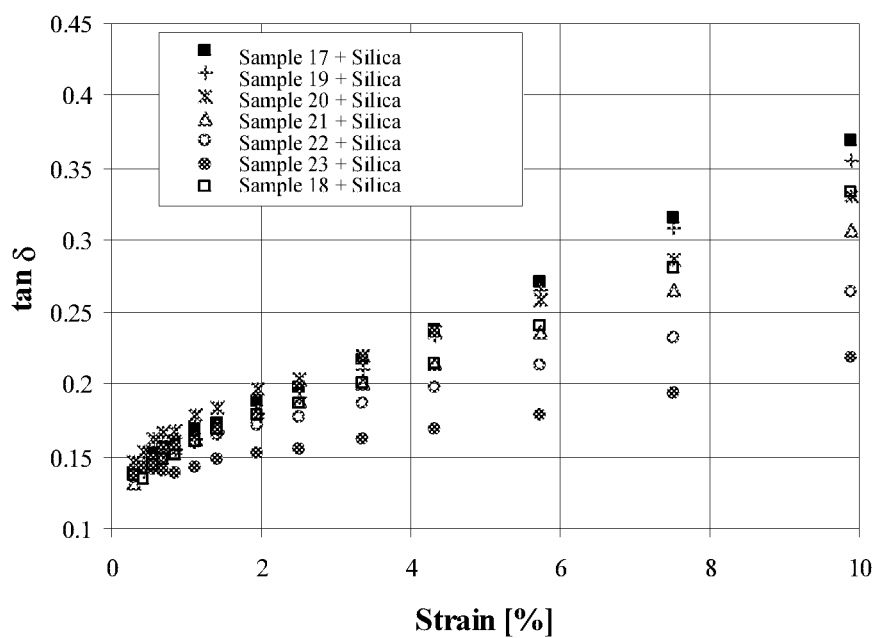

FIGS. 16 and 17 show the results of the strain sweeps conducted at 40° C., measured after the 16 minute 160° C. heat treatment of the samples. The $I_2$—N,N'-(m-phenylene)bismaleamic acid modification results in a significant reduction of G' and G" at low frequencies indicating a strong interaction between the silica and the polymer bound maleamic acid functional groups. The need for the formation of conjugated diene is underlined by the higher low strain G' and G" maximum of the sample modified with N,N'-(m-phenylene)bismaleamic acid alone at the same N,N'-(m-phenylene)bismaleamic acid concentration. Phase angle is also reduced compared to the control and it is decreasing with increasing concentrations of the additives. FIG. 18 shows the tan δ as a function of strain in the 0.28-10% strain range.

Example 8

In this example, the effect of modifying an emulsion polymerized stryene-butadiene rubber is illustrated. A set of samples 24 through 28 were made by using an emulsion polymerized styrene butadiene rubber (ESBR, PLF 1502) in order to show that ESBR can also be functionalized in a mixer via the addition of iodine and N,N'-(m-phenylene) bismaleamic acid. Mixing conditions were the exact same as in case of SSBR and it is described in the experimental section. The molar amounts of chemicals used for the functionalization of ESBR are listed in Table 8. Two control samples were also made for comparison purposes. Control Sample 24 was made by subjecting the polymer to the same shear in the mixer as the rest of the modified samples. Control Sample 25 was made by adding 60 mmol/kg N,N'-(m-phenylene)bismaleamic acid to ESBR.

TABLE 8

| Sample No. | Iodine | | MPBMA[1] | |
| --- | --- | --- | --- | --- |
| | [mmol/kg] | [phr] | [mmol/kg] | [phr] |
| 24 | 0 | 0 | 0 | 0 |
| 25 | 0 | 0 | 60 | 1.82 |
| 26 | 20 | 0.51 | 20 | 0.61 |
| 27 | 40 | 1.02 | 40 | 1.22 |
| 28 | 60 | 1.52 | 60 | 1.82 |

[1]N,N'-(m-phenylene) bismaleamic acid

Figure 19:
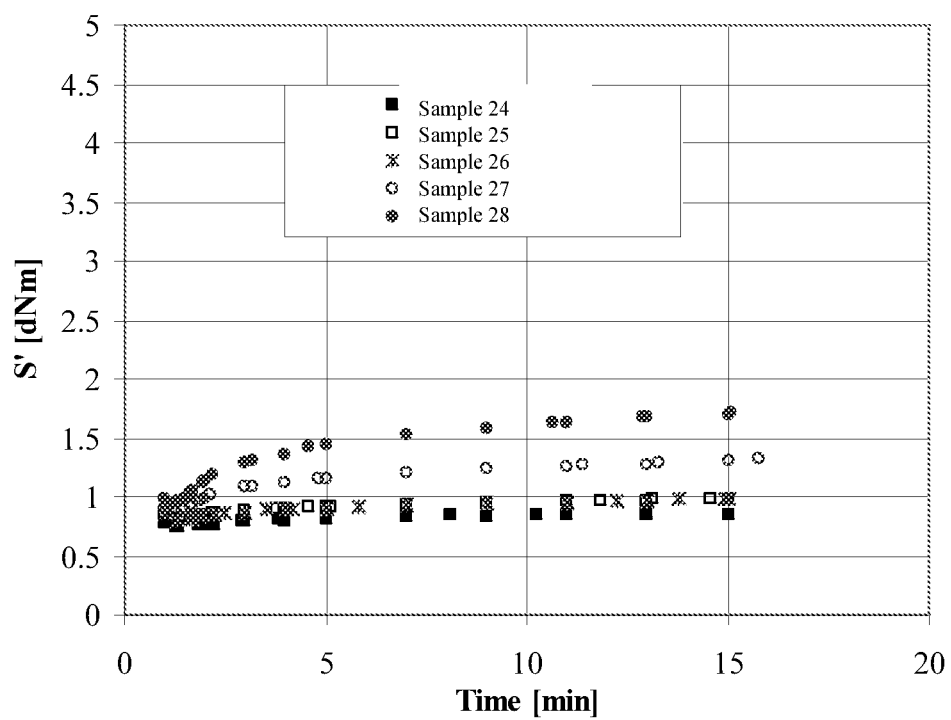

At 160° C. the modified samples showed some limited cure activity as depicted by FIG. 19. RPA measurements were carried out using standard conditions, 1.667 Hz and 7% strain at 160° C.

Torque increase is significantly lower than the corresponding values obtained with SSBR (see FIG. 10). In FIGS. 10 and 19 the same range of S' was used to aid comparison. The lower cure activity is likely due to the lower BD content of the sample as PLF1502 contains 23.5 wt % styrene and SSBR 18 wt %. The higher 1,2 and trans-1,4 content may also influence the Diels-Alder reaction.

Example 9

Figure 20:
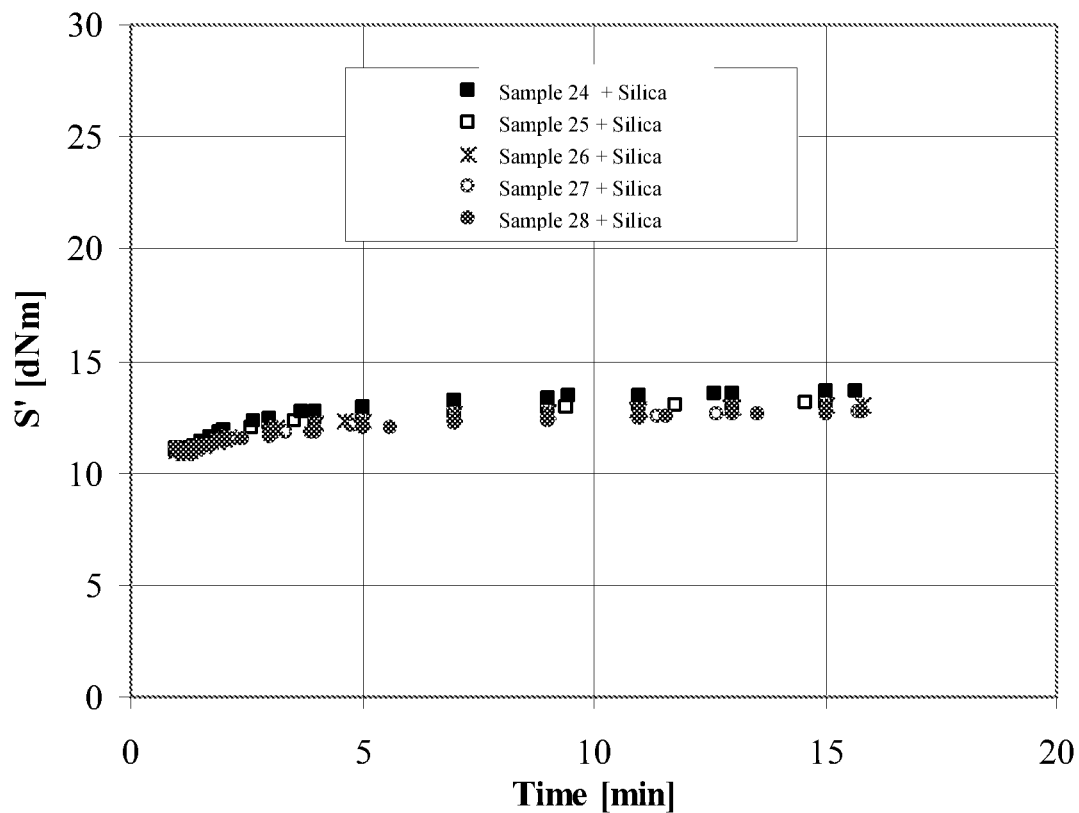

In this example, the effect of mixing the samples of Example 8 with silica is illustrated. The samples filled with silica (50 phr) and oil (20 phr) showed no significant cure activity. FIG. 20 displays the registered cure curves of the filled compounds. According to the results in FIG. 20 torque increase is marginal. The highest torque increase is shown by the control, which contained only the silica and the oil. This torque increase is due to the flocculation of the silica. This diminished cure activity of the filled and modified samples compared to the raw polymers implies that the maleamic acid groups were effectively extracted out from the polymer matrix by silica suggesting the ability of N,N'-(m-phenylene) bismaleamic acid to interact with the filler effectively.

Figure 21:
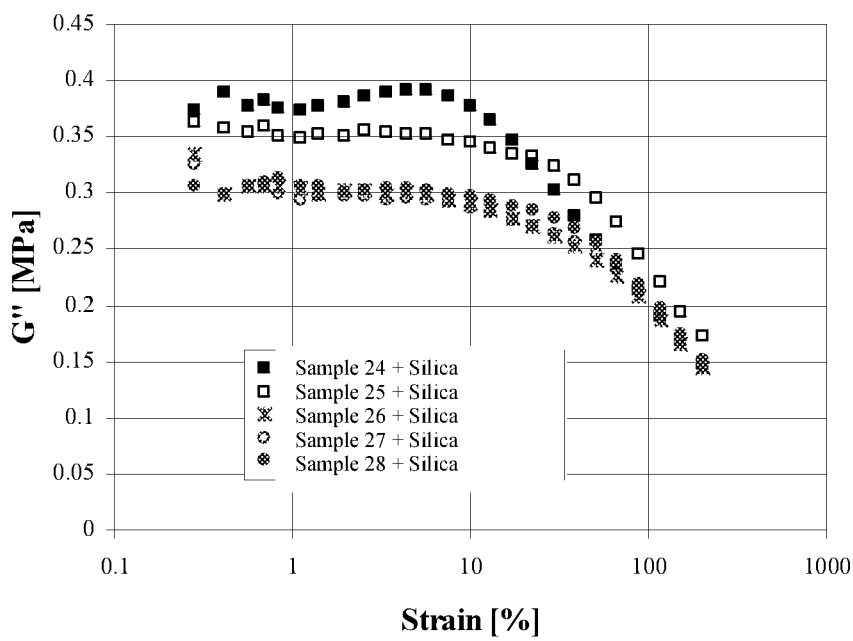
Figure 22:
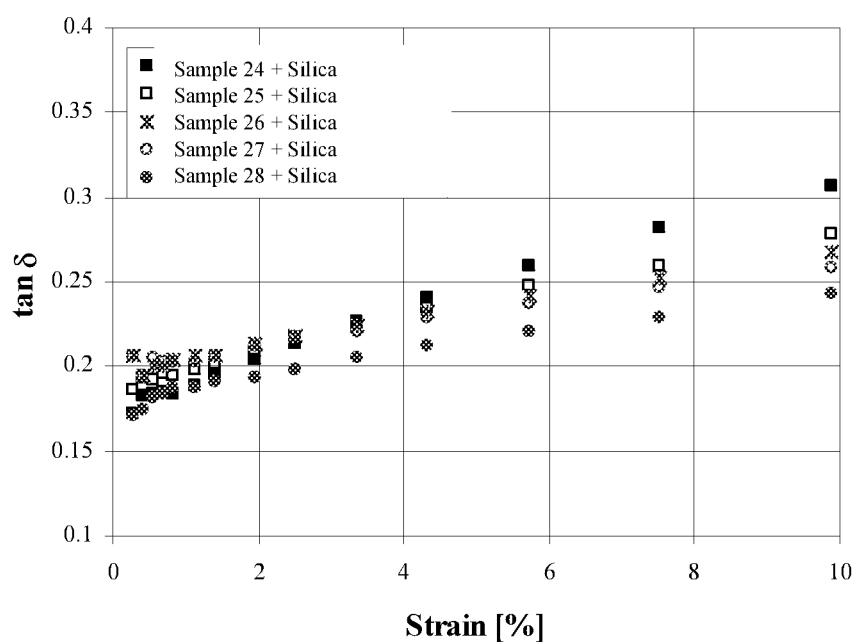

The samples, compounded with filler and oil as described in the experimental section, were tested as is, i.e., without thermal relaxation. RPA measurements were carried out at 40° C. Strain sweeps were conducted after 16 minutes conditioning of the sample in the die at 40° C., 1 Hz and 0.28% strain. FIG. 21 shows the strain dependence of the loss modulus. The highest strain dependence is displayed by the control. Upon modification it is reduced. The control sample modified with the same amount of N,N'-(m-phenylene)bismaleamic acid also shows reduced G", however the degree of improvement is less pronounced than in the case of iodine modified sample having the same N,N'-(m-phenylene)bismaleamic acid concentration. The phase angle is also reduced as shown in FIG. 22. This is important as the tan δ at about 5% is considered to be a good predictor of the rolling resistance.

Figure 23:
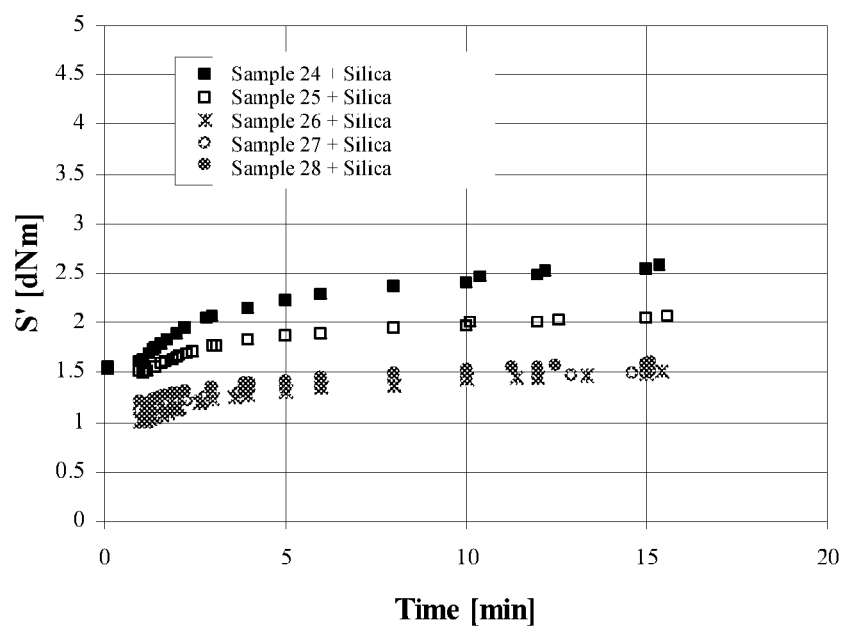

The ability of the modified polymers to retard silica flocculation at 160° C. is illustrated by FIG. 23. Table 9 lists the minimum, maximum and delta torque values.

TABLE 9

| | Sample No. | | | | |
|---|---|---|---|---|---|
| | 24 | 25 | 26 | 27 | 28 |
| $S'_{min}$ [dNm] | 1.54 | 1.44 | 1.05 | 0.95 | 1.12 |
| $S'_{max}$ [dNm] | 2.53 | 1.97 | 1.62 | 1.31 | 1.54 |
| $S'_{max} - S'_{min}$ [dNm] | 0.99 | 0.53 | 0.57 | 0.36 | 0.42 |

Figure 24:
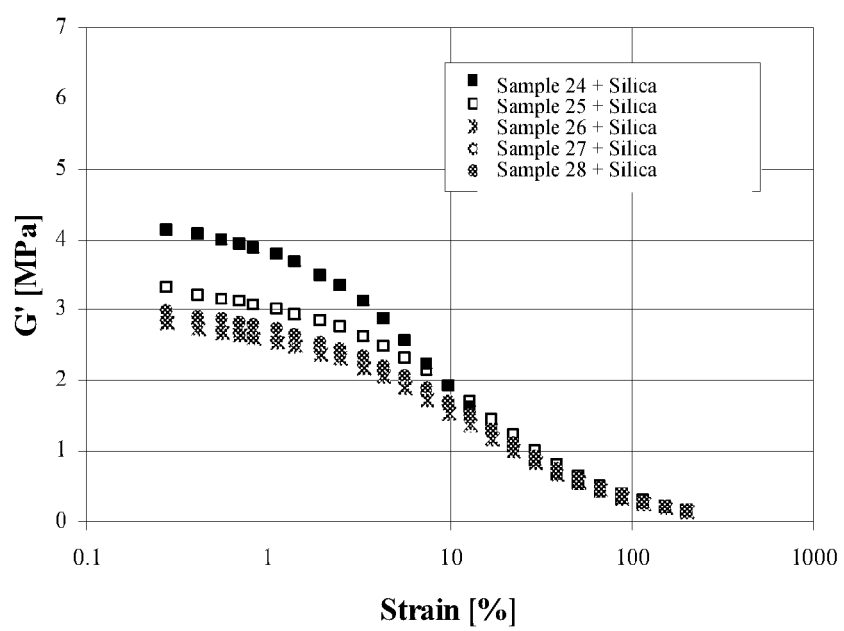
Figure 25:
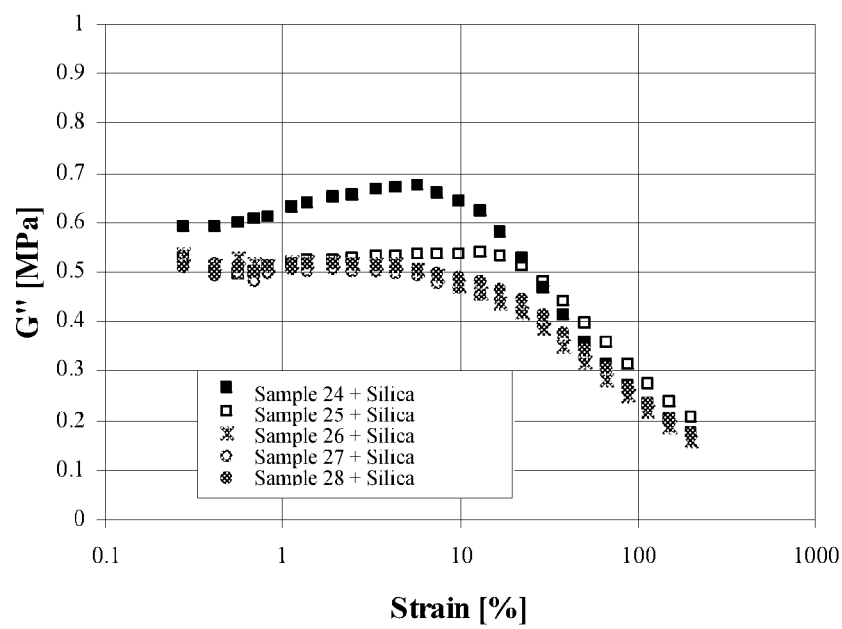

FIGS. 24 and 25 show the results of the strain sweeps conducted at 40° C., measured after the 16 minute 160° C. heat treatment of the samples. The $I_2$—N,N'-(m-phenylene) bismaleamic acid modification results in a reduction of G' and G" at low frequencies. The need for the formation of conjugated diene via iodination is underlined by the higher G' plateau and G" maximum of the sample modified with N,N'-(m-phenylene)bismaleamic acid alone at the same N,N'-(m-phenylene)bismaleamic acid concentration.

These results show that solution and emulsion SBRs can also be functionalised in a mixer with this method of the present invention. Binding of N,N'-m-phenylenebismaleamic acid to the polymer was achieved by Diels-Alder reaction between the reactant and the conjugated diene generated by the addition of small amounts of iodine prior to the introduction of N,N'-m-phenylenebismaleamic to the mixer. Polymers mixed with silica displayed a strong interaction with filler manifested by reduced storage and loss modulus at low strains and greatly inhibited tendency for filler flocculation. SSBR compounds also displayed a strong reduction of the phase angle in the entire frequency range.

The unfilled modified polymers showed some cure activity, which was absent once the polymers were filled with silica. This implies the effective extraction of the maleamic groups from the polymer matrix via the filler, i.e., a strong interaction between the polymer bound functional groups and the filler.

Experimental Methods for Examples 10 Through 13

The modification of polymers and the shearing of the controls were carried out in a 300 cm$^3$ Rheomix® 3000E mixer head attached to a Haake Buchler HBI System 90 drive unit. The starting temperature was 60° C. First the polymer was added followed by the iodine flakes at 20 rpm. These were mixed for 2 minutes at 60 rpm rotor speed. Next N,N'-(m-phenylene)bismaleamic acid was added at 20 rpm and they were mixed for an additional 3 minutes at 60 rpm. Typical dump temperature during polybutadiene modification was around 96-97° C. and 97-101° C. in case of Natural rubber.

Addition of fillers and oil (50 phr silica, 4 phr black and 20 phr oil) was done using a HaakeBuchler System 40 drive unit equipped with a 75 ml Rheomixer® mixer head. Fill factor was set at 73%. Mixing was carried out using 60 rpm rotor speed and 130° C. as starting temperature. First the rubber was added followed by the addition of fillers mixed with the oil. The rotor speed was 20 rpm during these steps and it took about one minute. Next the rotor speed was increased to 60 rpm and mixing was continued for 1.5 minutes. During this period, temperature increased from 130° C. to about 160° C. in case of polybutadiene and 145° C. in case of natural rubber. After the first mixing step a sweep was carried out and it was followed by a second mixing step at 60 rpm lasting for 1 minute. Typical dump temperature was around 165-166° C. in case of polybutadiene and 150-154° C. in case of natural rubber.

All mixes were refined on a warm mill using ⅛" gap.

Rheological measurements were done using the Alpha Technology RPA 2000 instrument. Filler flocculation measurements were done at 160° C. using 0.7 strain and 1.667 Hz. Strain sweeps were conducted at 40° C. at 1 Hz frequency. Strain was varied from 0.28% to 200%.

Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 wt % solution of polymer in THF through a 0.45 μm filter prior to injection. Data was processed using the ASTRA software of Wyatt Technology.

Example 10

In this example, the effect of modifying a polybutadiene with a dienophile is illustrated. Two sets of samples were made by adding first iodine and than N,N'-m-phenylene-bismaleamicacid to the polymer in a mixer. Mixing conditions are described in the experimental section. The molar amounts of chemicals used for the functionalization of the polymer are listed in Table 10. Two control samples were also made for the polymer for comparison purposes. Controls were made by subjecting the polymer to the same shear in the mixer as the modified samples were exposed to. An additional control was made by adding N,N'-(m-phenylene)bismaleamic acid only to the polybutadiene.

TABLE 10

| Sample No. | Iodine [mmol/kg] | [phr] | MPBMA[1] [mmol/kg] | [phr] |
|---|---|---|---|---|
| 29 | 0 | 0 | 0 | 0 |
| 30 | 0 | 0 | 0 | 0 |
| 31 | 0 | 0 | 20 | 0.61 |
| 32 | 10 | 0.25 | 10 | 0.30 |
| 33 | 20 | 0.51 | 20 | 0.61 |
| 34 | 30 | 0.76 | 30 | 0.91 |
| 35 | 40 | 1.02 | 40 | 1.22 |
| 36 | 60 | 1.52 | 60 | 1.82 |

[1]N,N'-(m-phenylene) bismaleamic acid

Table 11 lists the molecular weight of polybutadiene samples before and after modification. According to the results there is no major or systematic change in molecular weights indicating the absence of shear degradation or crosslinking by the bifunctional N,N'-m-phenylene-bismaleamicacid at the temperature of the reaction. This is different from high cis polyisoprene where a molecular weight decrease and SBRs where a molecular weight increase was recorded.

TABLE 11

| Sample No. | $M_n$ [kDalton] | $M_w$ [kDalton] | $M_z$ [kDalton] | $M_w/M_n$ | $M_z/M_w$ |
|---|---|---|---|---|---|
| 29 | 201 | 617 | 1800 | 3.08 | 2.92 |
| 30 | 212 | 585 | 1653 | 2.76 | 2.83 |
| 31 | 208 | 610 | 1790 | 2.93 | 2.93 |
| 32 | 200 | 580 | 1759 | 2.90 | 3.04 |
| 33 | 209 | 589 | 1806 | 2.82 | 3.07 |
| 34 | 208 | 616 | 1901 | 2.96 | 3.09 |
| 35 | 206 | 620 | 1872 | 3.00 | 3.02 |

Figure 26:
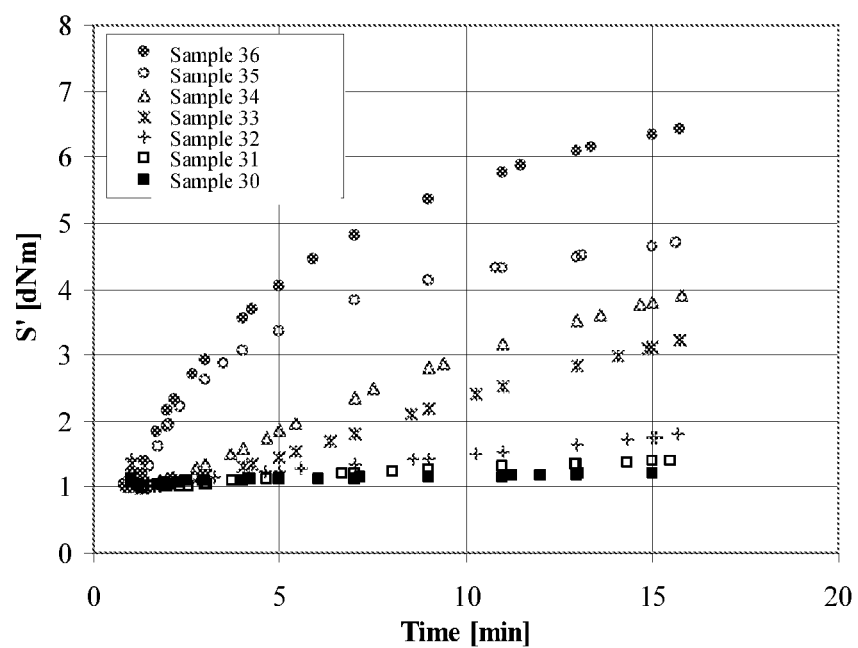

Evidence of the formation of conjugated diene and subsequent Diels Alder reaction between the conjugated dienes or conjugated diene and N,N'-(m-phenylene)bismaleamic acid was obtained at higher temperature. At 160° C. the modified polybutadiene samples displayed cure activity as shown by FIG. 26. In FIG. 26 the curves were shifted to the same minimum torque value in order to aid comparison. The actual minimum, maximum and delta torque values are listed in Table 12. According to the results, torque increase in the sheared control and the sample containing N,N'-(m-phenylene)bismaleamic acid is minimal. Sample 32 modified with 10 mmol/kg $I_2$ and N,N'-(m-phenylene)bismaleamic acid has higher torque increase and it is progressively increasing with increasing concentrations of additives.

TABLE 12

| | Sample No. | | | | | | |
|---|---|---|---|---|---|---|---|
| | 30 | 31 | 32 | 33 | 34 | 35 | 36 |
| S'$_{min}$ [dNm] | 1.04 | 1.39 | 0.43 | 0.28 | 0.35 | 0.64 | 1.37 |
| S'$_{max}$ [dNm] | 1.19 | 1.78 | 1.2 | 2.51 | 3.21 | 4.29 | 6.81 |
| S'$_{max}$ − S'$_{min}$ [dNm] | 0.15 | 0.39 | 0.77 | 2.23 | 2.86 | 3.65 | 5.44 |

Example 11

In this example, the effect of modifying a natural rubber with a dienophile is illustrated. Two sets of samples were made by adding first iodine and than N,N'-m-phenylene-bismaleamic acid to the polymer in a mixer. Mixing conditions are described in the experimental section. The molar amounts of chemicals used for the functionalization of polymers are listed in Table 13. Two control samples were also made for each polymer for comparison purposes. Controls were made by subjecting the polymers to the same shear in the mixer as the modified samples were exposed to. An additional control was made by adding N,N'-(m-phenylene)bismaleamic acid only to the natural rubber.

Figure 27:
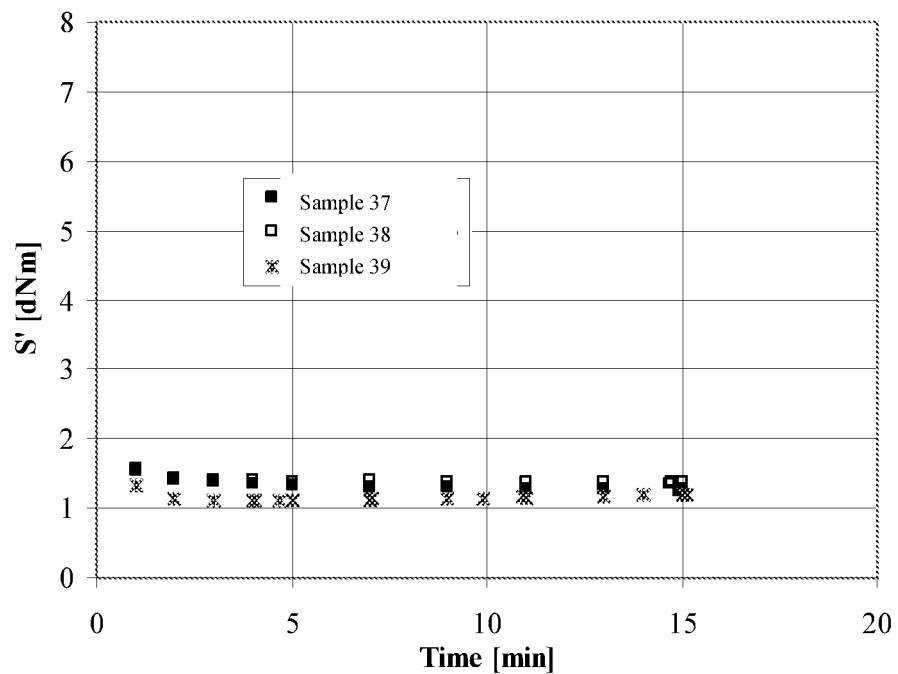

In contrast to the modified polybutadiene of Example 10, the modified natural rubber sample did not show any torque increase at 160° C. (see FIG. 27).

TABLE 13

| Sample No. | Iodine [mmol/kg] | [phr] | MPBMA[1] [mmol/kg] | [phr] |
|---|---|---|---|---|
| 37 | 0 | 0 | 0 | 0 |
| 38 | 0 | 0 | 33 | 1.00 |
| 39 | 33 | 0.84 | 33 | 1.00 |

[1]N,N'-(m-phenylene) bismaleamic acid

Example 12

Figure 28:
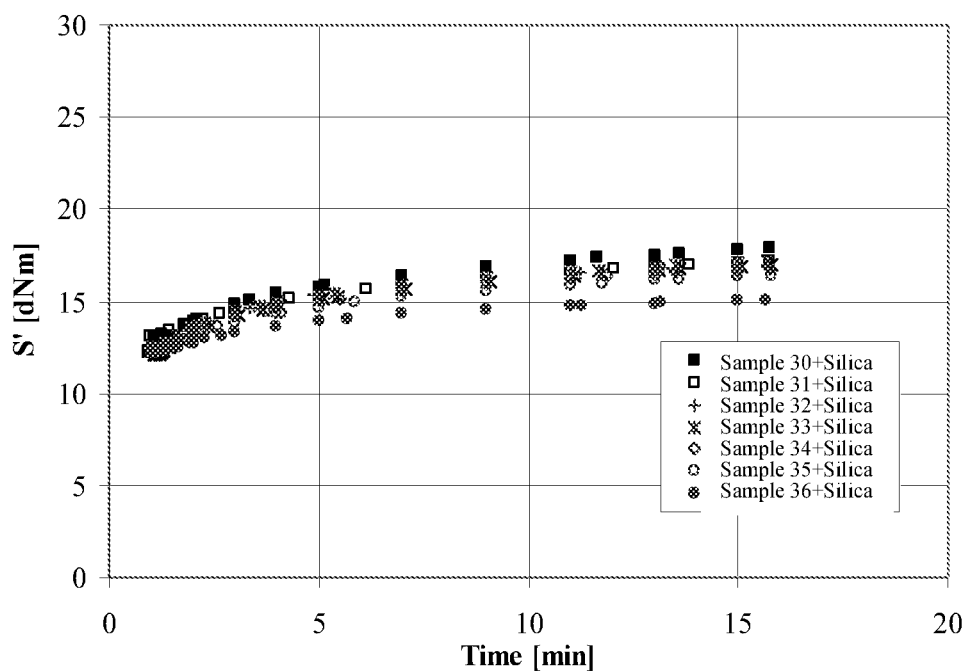

In this example, the effect of mixing silica with the modified polybutadiene of Example 10 and modified natural rubber of Example 111 is illustrated. Although the results of Example 10 imply that the modified polybutadiene samples could scorch during mixing the samples with silica, it did not happen. The compounds filled with silica (50 phr) and oil (20 phr) showed no significant cure activity. FIG. 28 displays the registered cure curves of the filled compounds. According to the results shown in FIG. 28, torque increase of samples reversed compared to the ranking of the raw polymers. The highest torque increase is shown by the control, which contained only the silica and the oil. This torque increase is due to the flocculation of the silica. Torque increase in the modified samples was less and it decreased with increasing level of modification indicating the ability of the modified polymer to retard silica flocculation. This diminished cure activity of the filled and modified samples implies that the maleamic acid groups were effectively extracted out from the polymer matrix by the silica suggesting the ability of N,N'-(m-phenylene)bismaleamic acid to interact with the filler.

Figure 29:
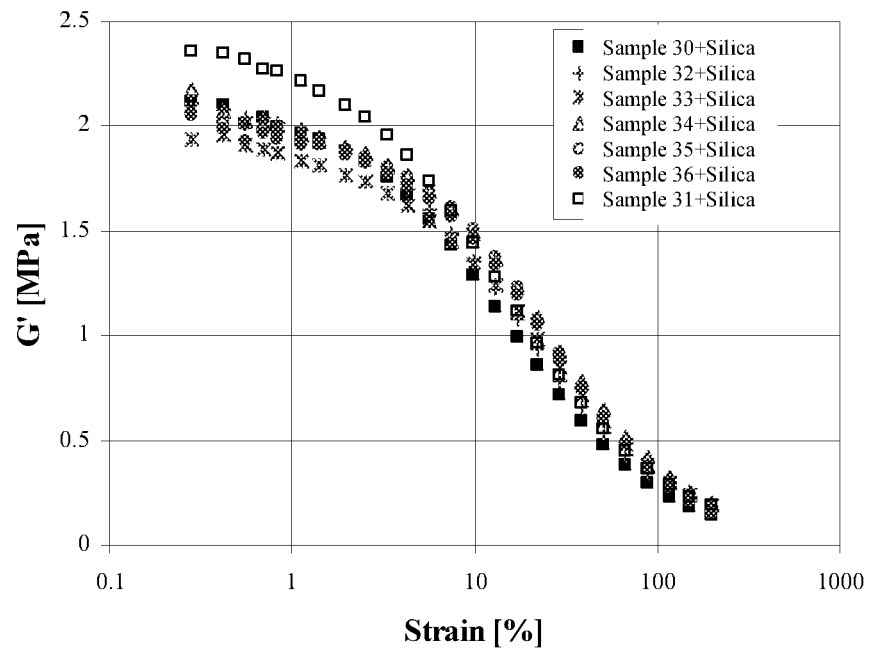
Figure 30:
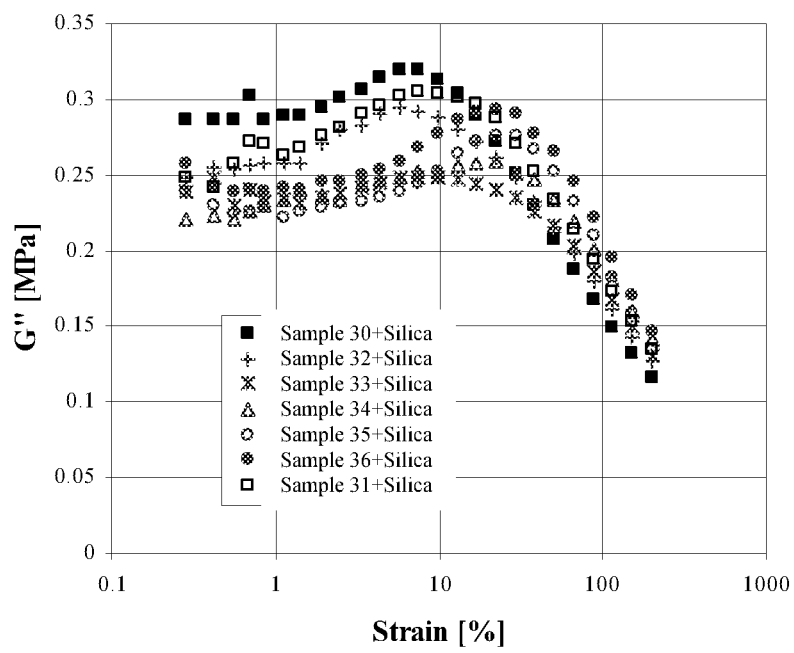
Figure 31:
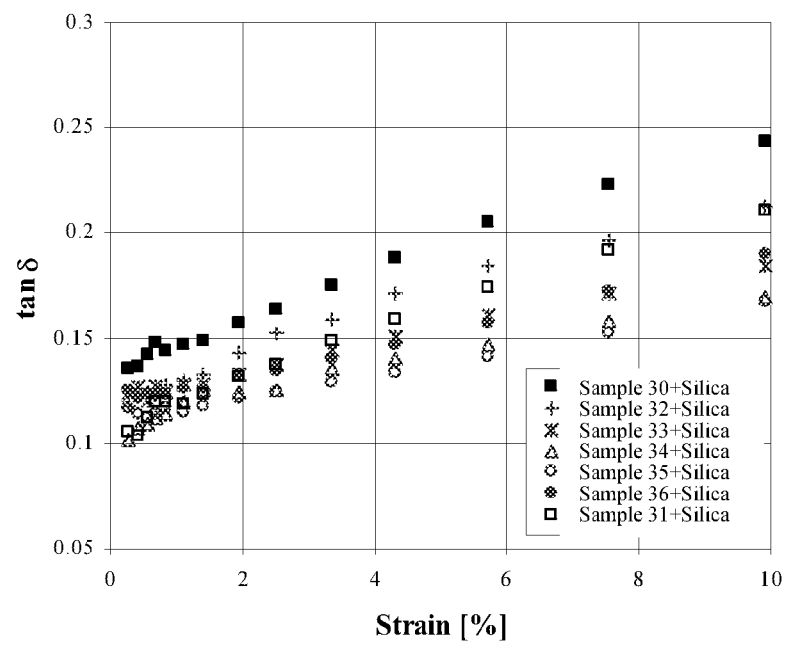

The samples, compounded with filler and oil, as described in the experimental section, first were tested as is, i.e., without thermal relaxation. RPA measurements were carried out at 40° C. Strain sweeps were conducted after 16 minutes conditioning of the sample in the die at 40° C. using 1 Hz and 0.28% strain. FIGS. 29 and 30 show the strain dependence of the storage and loss modulus of the polybutadiene samples. The G' of the control sample is relatively low compared to previous results achieved with synthetic polyisoprene or SSBR. It shows no change with the modification of the polymer. In contrast the loss modulus (see FIG. 30) of the modified samples is reduced compared to the control sample. As a result the phase angle is also reduced by the modification of the samples (see FIG. 31) and it seems to reach a minimum at 30-40 mmol/kg concentration of the reactants.

Figure 32:
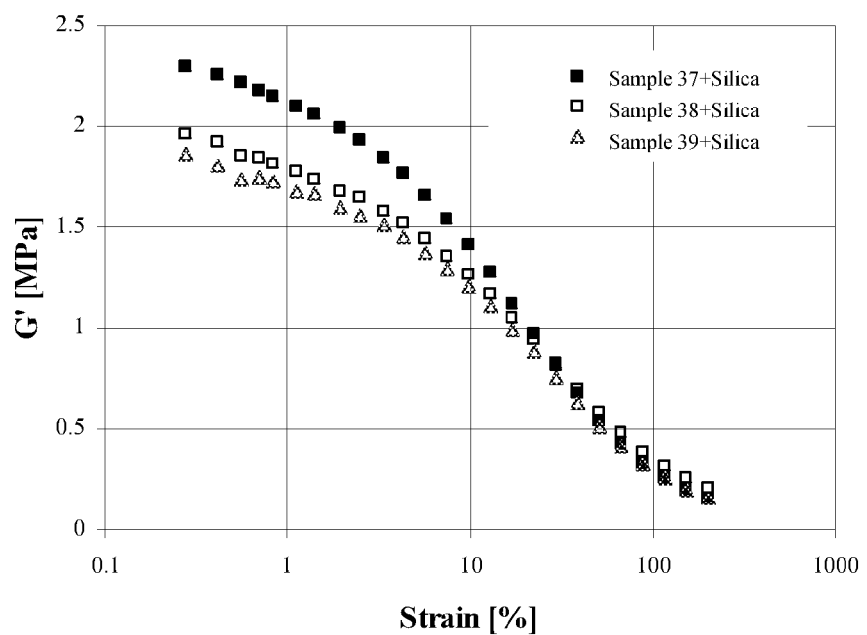
Figure 33:
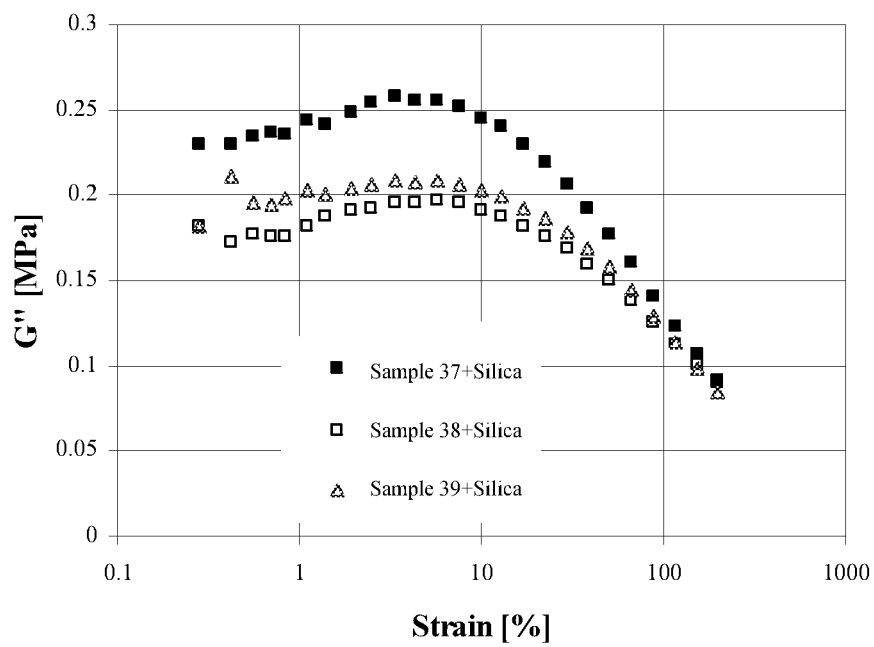

In contrast both the G' and G" of the modified natural rubber sample of Example 11 is reduced compared to the control (see FIGS. 32 and 33). The reduction of the low strain elastic and loss modulus is about the same in magnitude resulting in no change in the phase angle. Interestingly N,N'-(m-phenylene)bismaleamic acid alone gave very similar results.

The difference in filler interaction between modified samples and the controls were brought out by the heat treatment of the samples at 160° C.

Figure 34:
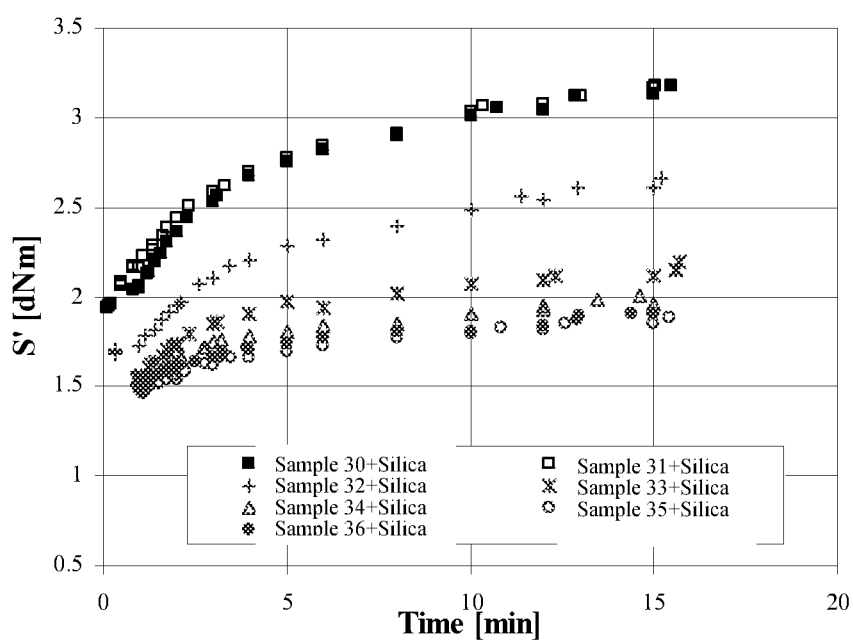

Thermal treatment of the samples was carried out in the RPA die. Samples were heated to 160° C. for 16 minutes. Change in compound stiffness during the heat treatment was monitored at 1.667 Hz using 0.7 strain. FIG. 34 shows the results obtained with the polybutadiene samples. The highest torque increase is displayed by the control sample. This increase of compound stiffness is thought to be a result of the formation of filler agglomerates by the Brownian movement of aggregates assisted by the relaxation of rubber matrix. Alternatively, it is believed to be the result of increasing percolating cluster size due to the formation of polymer bridges between neighboring aggregates.

According to the results S' of the control sample increased by 1.3 MPa during the heat treatment. The control with 20 mmol/kg N,N'-(m-phenylene)bismaleamic acid showed a similar increase. The modified samples have a lower starting (minimum) torque and the torque increase was progressively reduced from 1 MPa to 0.4 MPa with increasing level of modification. This suggests that the chemically bonded N,N'-(m-phenylene)bismaleamic acid may inhibit the flocculation of silica via improved filler-polymer interaction.

Figure 35:
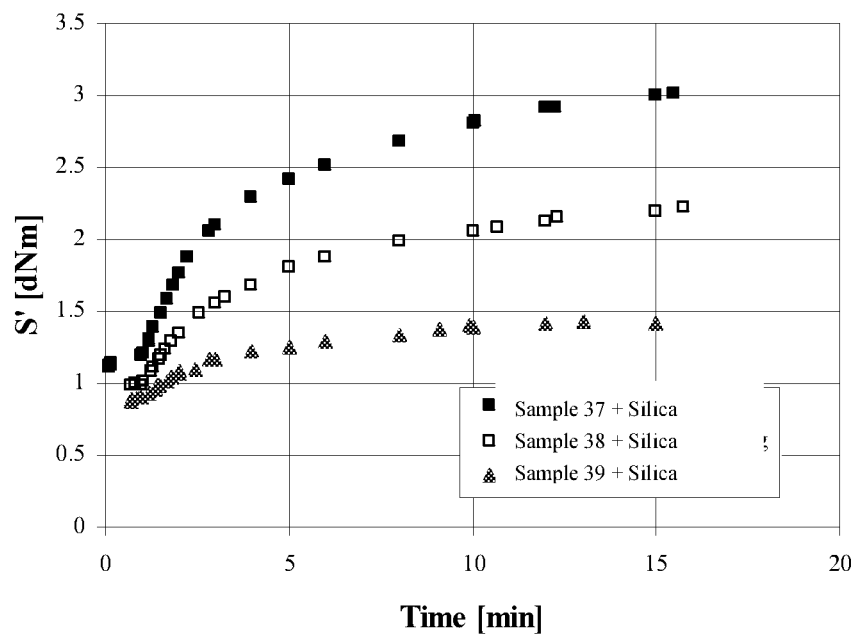
Figure 36:
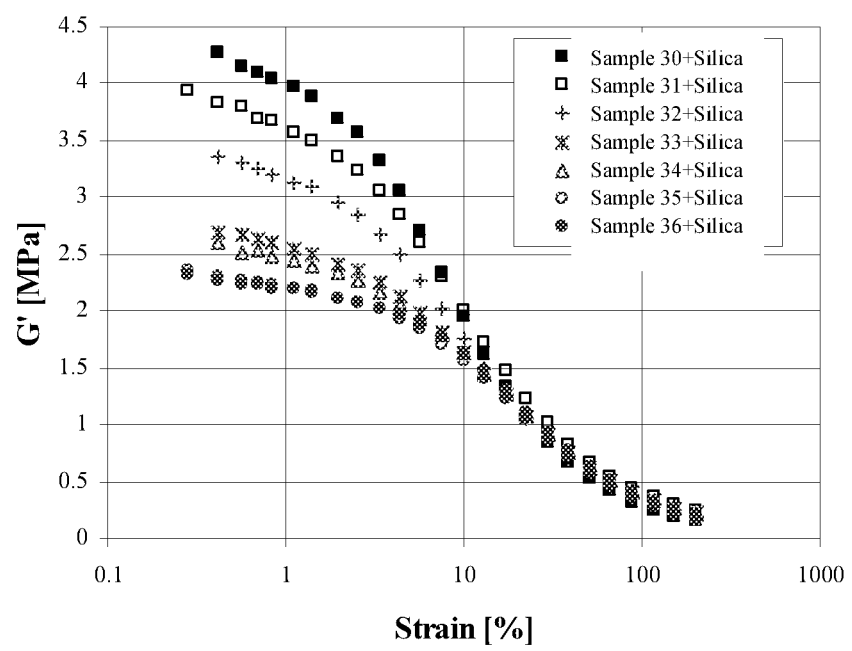
Figure 37:
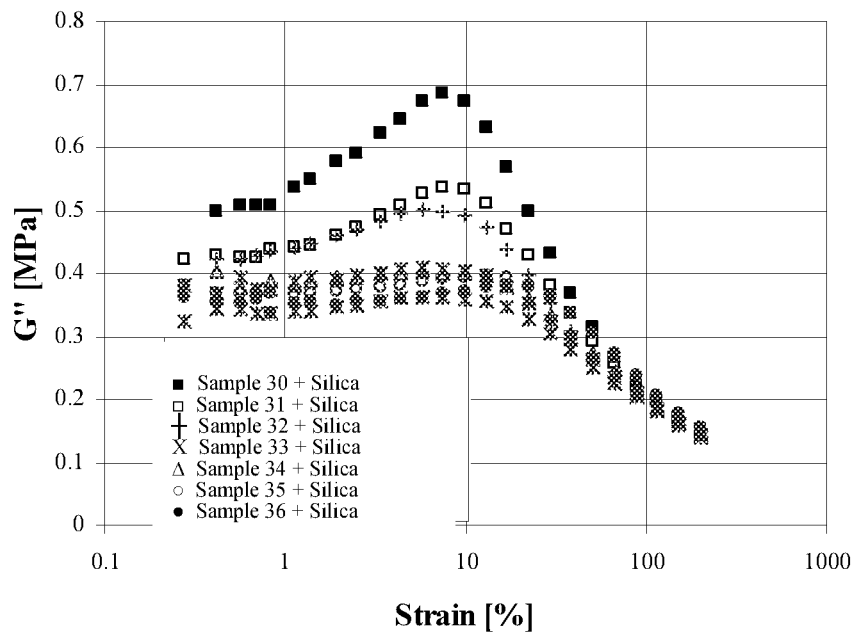
Figure 38:
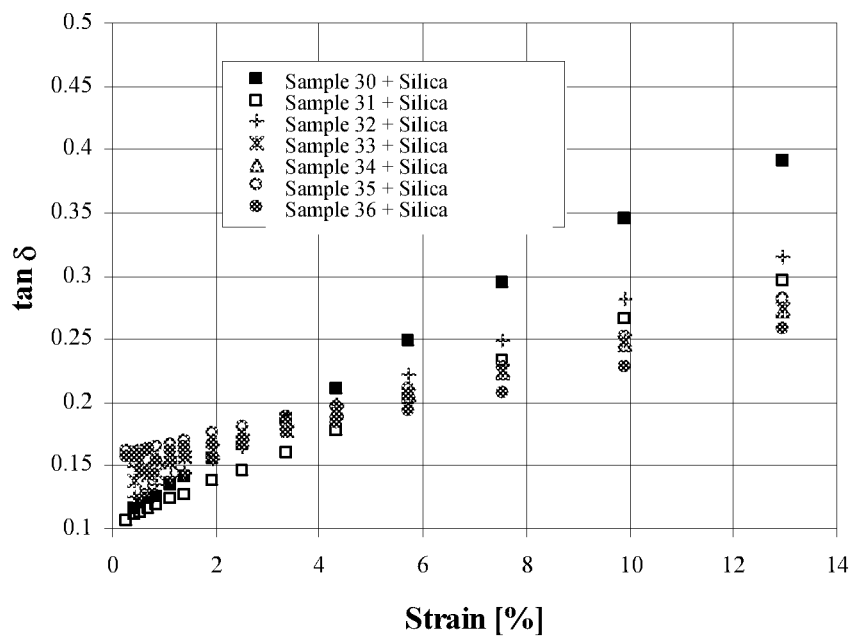
Figure 39:
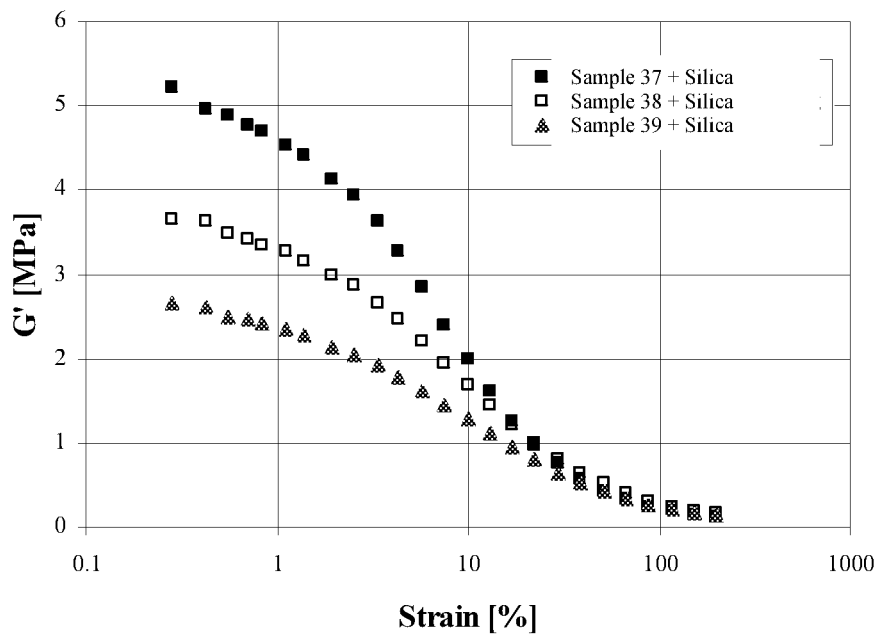
Figure 40:
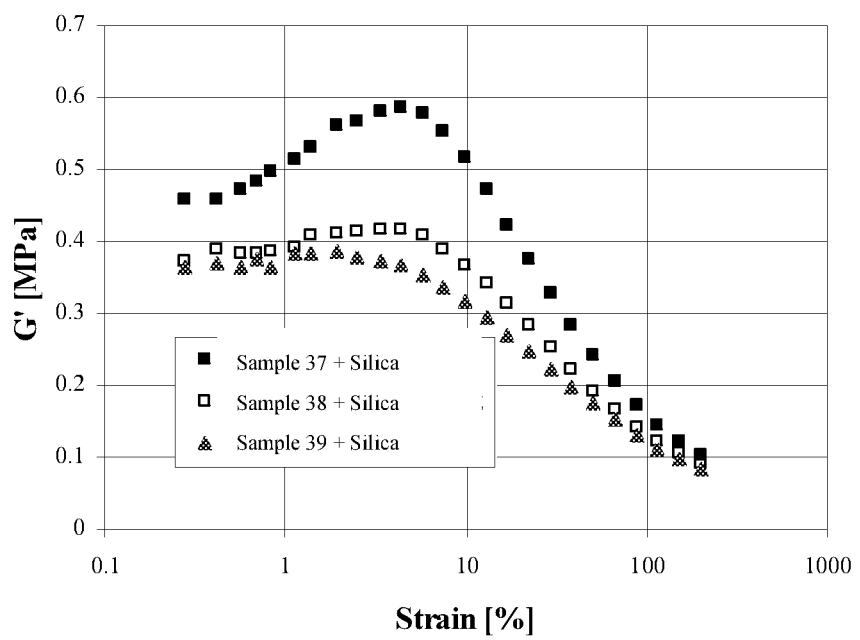
Figure 41:
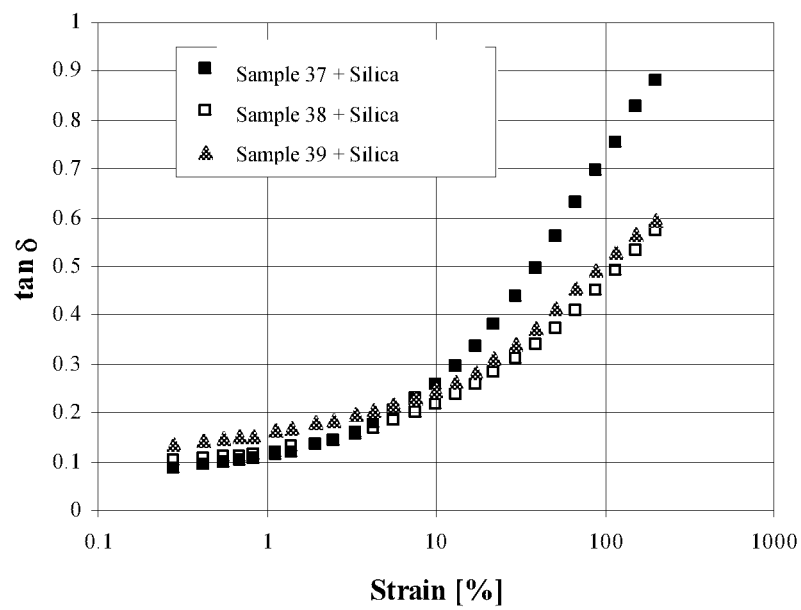

FIG. 35 displays the results obtained with Natural rubber. Here the increase of S' of the control is even more dramatic than that of polybutadiene. This is likely due to the lesser ability to of the isoprene units to interact with the filler (silica or black) compared to the butadiene units. S' of the Natural rubber control sample tripled during the heat treatment. The control sample containing N,N'-(m-phenylene)bismaleamic acid shows a reduced but still sizable torque increase, approximately 1.2 MPa. The iodine/N,N'-(m-phenylene)bismaleamic acid modified sample displays the lowest torque increase, 0.55 MPa.

After the heat treatment of the samples an additional strain sweep was carried out to determine the changes in the Payne effect caused by the flocculation of the filler. FIGS. 36 through 41 show the results of these strain sweeps conducted at 40° C.

Apparently the $I_2$—N,N'-(m-phenylene)bismaleamic acid modification results in a significant reduction of G' and G" at low frequencies indicating a strong interaction between the silica and the polymer bound maleamic acid functional groups. The need for the formation of conjugated diene is underlined by the higher low strain G' and G" maximum of the sample modified with N,N'-(m-phenylene)bismaleamic acid alone compared to the sample modified by iodine and the same concentration of N,N'-(m-phenylene)bismaleamic acid. Phase angle is also reduced compared to the control and it is decreasing with increasing concentrations of the additives.

These results show that the interaction of diene polymers with silica can be improved by chemically bonding small amounts of N,N'-m-phenylenebismaleamic acid to the polymer chain via Diels Alder reaction. Conjugated diene needed for the reaction is generated by the iodine treatment of the polymers or by the use of mild brominating agents in case of isoprene containing polymers. The reduction of the strain dependence of the elastic and loss modulus as well as the ability of the modified polymers to retard filler flocculation suggests improved filler interaction.

Example 13

In this example the effect of modifying an SSBR with a dienophile having a triethoxysilyl functionality is illustrated. The experiment was carried out using an SSBR and triethoxysilylpropylmaleamic acid (TEOSPMA) as dienophile carrying the triethoxysilyl functional group. 90% pure triethoxysilylpropylmaleamic acid was obtained from Gelest, Inc. and was used as received.

The modification of SSBR and compounding of the modified polymer with silica was carried out using a HaakeBuchler System 40 drive unit equipped with a 75 ml Rheomixer® mixer head. Fill factor was set at 73%. First 48.18 g polymer was added to the mixer heated to 100° C. and it was followed by the addition of iodine flakes (0.49 g, 1 phr, 40 mmol/kg)) at 20 rpm. These were mixed for 2 minutes at 60 rpm rotor speed. During mixing the temperature increased to 129° C. Next calcium stearate (1.40 g, 2.9 phr, 40 mmol/kg) was added to the mixer at 20 rpm and it was followed by a second mixing step lasting for one minute using 60 rpm. At the end of the second mixing step the temperature was 130° C. Finally 1.02 g triethoxysilylpropylmaleamic acid (2.1 phr, 66 mmol/kg) mixed with 1.93 g general purpose tire black was added to the mixer. These were mixed for 3 minutes at 60 rpm during which the temperature increased to 150° C.

Addition of filler and oil (50 phr silica and 20 phr oil) was done using the same mixer and fill factor. The mixer was preheated to 130° C. First the rubber was added to the mixer followed by the addition of silica mixed with the oil. The rotor speed was 20 rpm during this step and it took about one minute. Next the rotor speed was increased to 60 rpm and mixing was continued for 1.5 minutes. During this period temperature increased from 130° C. to 160° C. After the first mixing step a sweep was carried out and it was followed by a second mixing step using 60 rpm and lasting for 1 minute. The temperature increased to 170° C. during this step. Finally the content of the mixer was dumped and the mix was refined on a warm mill using ⅛" gap.

Figure 42:
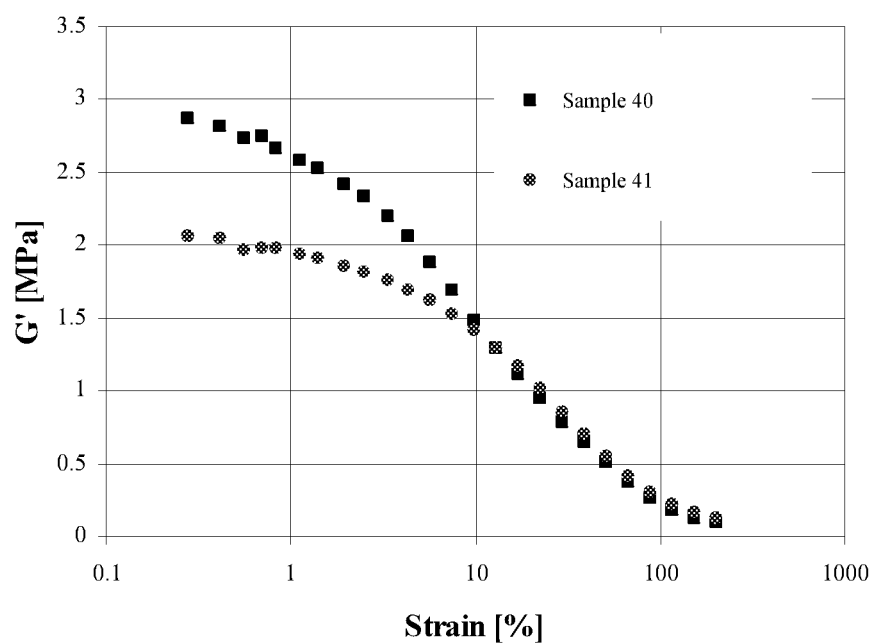
Figure 43:
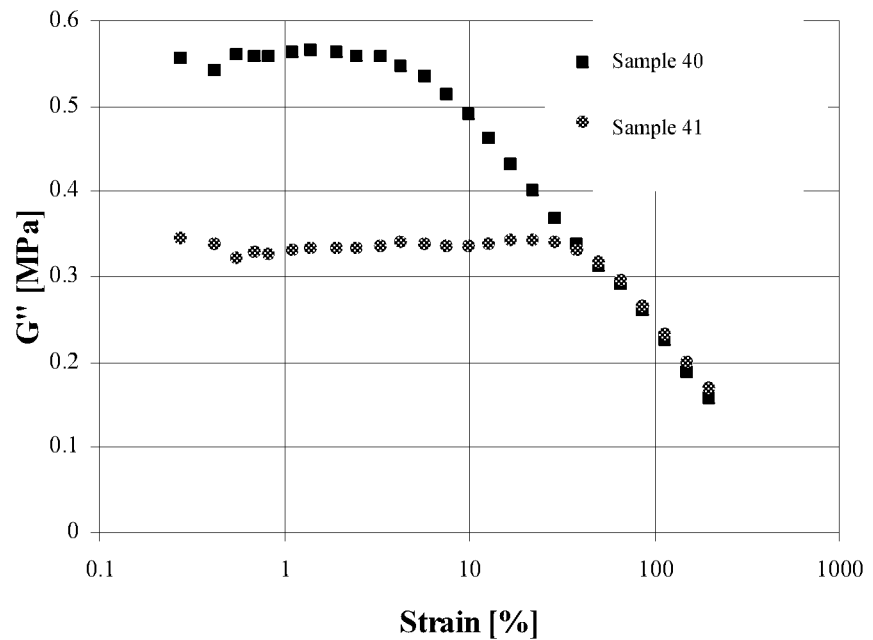
Figure 44:
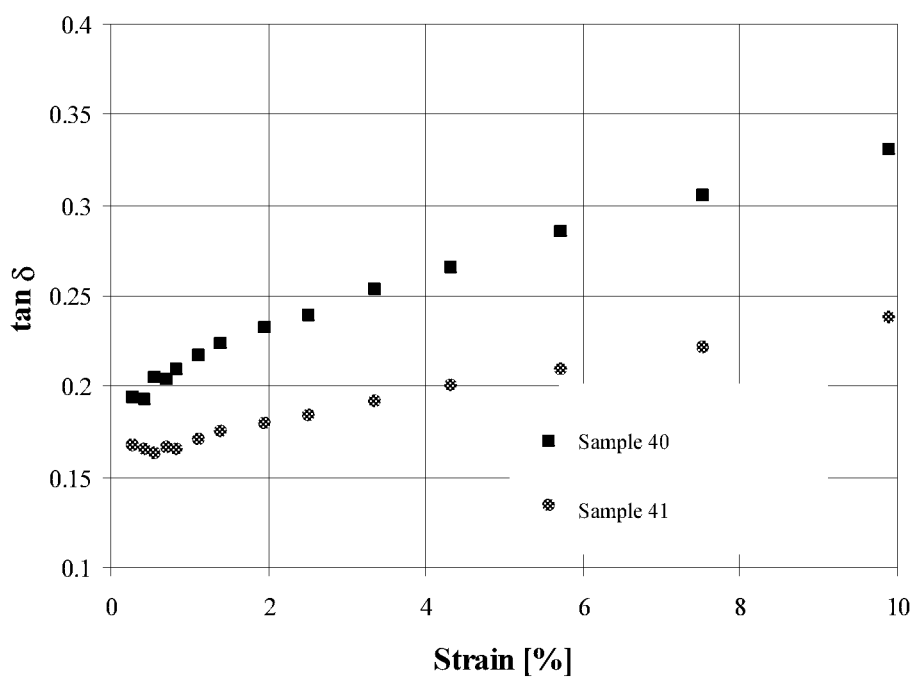

Sample 41, compounded with filler and oil, first was tested as is, i.e., without thermal relaxation. RPA measurements were carried out at 40° C. Strain sweeps were conducted after 16 minutes conditioning of the sample in the die at 40° C. using 1 Hz and 0.28% strain. FIGS. 42 and 43 show the strain dependence of the storage and loss modulus of the sample and it is compared to unmodified Sample 40 compounded with the same amount of ingredients. According to the results both the storage and the loss modulus of the modified sample are reduced at low strains compared to the control sample. The reduced strain dependence of G' and G" (reduced Payne effect) suggests the ability of the triethoxysilyl group to react with the silica. The phase angle is also reduced in a broad range of strain compared to the control sample as indicated by FIG. 44.

Subsequently the increase of compound stiffness with time was measured at elevated temperature (160° C.). Increase of compound stiffness as well as electric conductivity of uncured compounds upon storage is well known effect. It is generally attributed to the flocculation of the filler. The magnitude of this effect appears to increase with poorer dispersion, increasing temperature or decreasing molecular weight. Filler flocculation is strongly effected by the type of the filler, filler surface treatment and in general polymer-filler interaction. Increasing polymer-filler interaction reduces the rate of flocculation by restricting aggregate movement and/or formation of additional polymer bridges between aggregates. Therefore, measurement of compound stiffness provides an assessment of the filler-polymer interaction. Reduced increase of S' with time indicates stronger polymer-filler interaction. Thermal treatment of the samples was carried out in the RPA die. Samples were heated to 160° C. for 16 minutes. Change in compound stiffness (S') during the heat treatment was monitored at 1.667 Hz using 0.7 strain.

Figure 45:
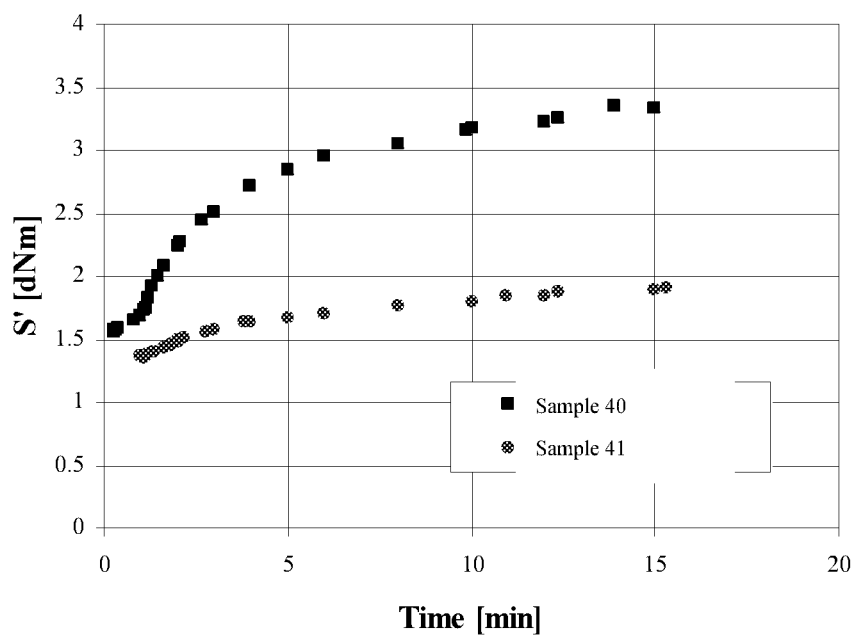

FIG. 45 compares the increase of S' in the control sample and the sample functionalised with iodine-TEOSPMA treatment. According to the results increase of S' is about 1.8 dNm in the control sample whereas it is only 0.6 dNm in the modified sample. This indicates a strongly impeded tendency for filler flocculation due to increased polymer-filler interaction.

Figure 46:
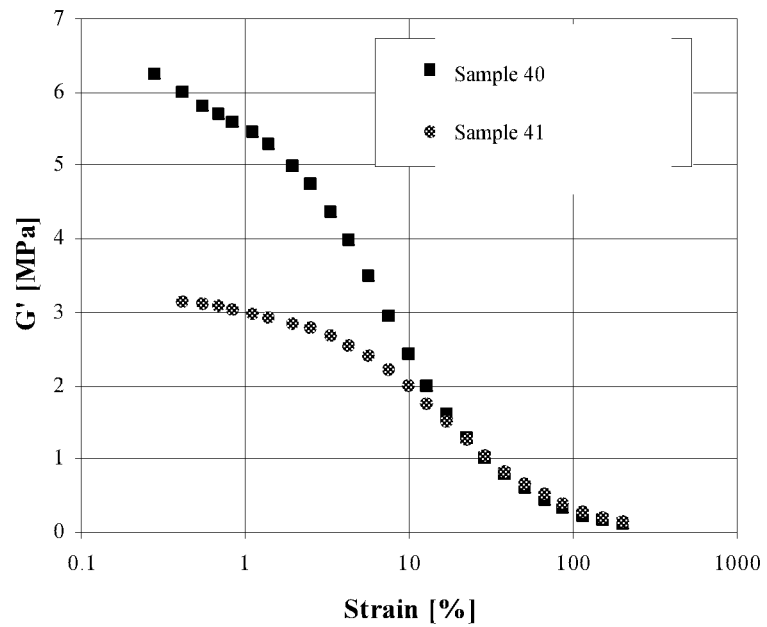
Figure 47:
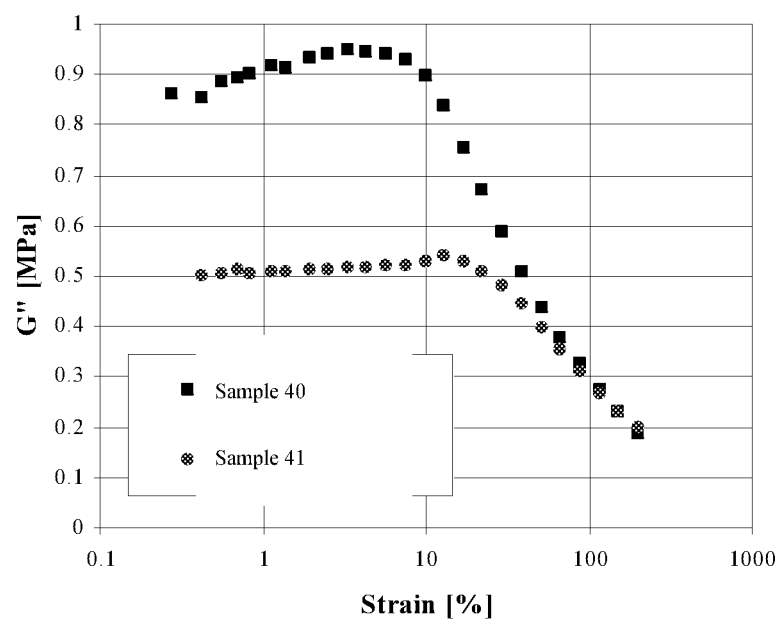

Strain dependence of G' and G'' was also measured after the 16 minutes 160° C. heat treatment of the samples. Strain sweeps were carried out at 40° C. using 1 Hz frequency. According to the results shown by FIGS. 46 and 47 loss and storage modulus at low strain increased in both samples, however, the increase is significantly higher in the control sample. For example G' of the modified sample at 0.28% strain increased from about 2 MPa to 3 MPa while in the control sample it increased from about 3 MPa to about 6 MPa. Here again, the reduced strain dependence of G' and G'' (reduced Payne effect) suggests the ability of the triethoxysilyl group to react with the silica.

Experimental Methods for Examples 14-20

The modification of polymers and the shearing of the controls were carried out in a 300 cm$^3$ Rheomix® 3000E mixer head attached to a Haake Buchler HBI System 90 drive unit. Fill factor was set at 73%.

Addition of carbon black and oil to the polymers (50 phr black and 20 phr oil) was done using a HaakeBuchler System 40 drive unit equipped with a 75 ml Rheomixer® mixer head or using the 300 cm$^3$ Rheomix® 3000E mixer head attached to a Haake Buchler HBI System 90 drive unit. Fill factor was 73%.

All mixes were refined on a warm mill using ⅛" gap.

Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 wt % solution of polymer in THF through a 0.45 μm filter prior to injection. Data was processed using the ASTRA software of Wyatt Technology.

Rheological measurements were done using the Alpha Technology RPA 2000 instrument. Filler flocculation measurements were done at 160° C. using 0.28% strain and 1.667 Hz. Strain sweeps were conducted at 40° C. at 1 Hz frequency. Strain was varied from 0.28% to 200%.

Example 14

This example illustrates the effect of compounding carbon black with an elastomer functionalized according to the present invention. For the experiments SSBR was used. In addition to N,N'-m-phenylene-bis-maleamic acid, maleamic acid (MAAc) was also tested as a dienophile.

A set of modified samples was made using 100° C. as starting temperature. Concentration of chemicals used is listed in Table 14. Chemical treatment of SSBR was carried out in a 300 ml mixer head using the following procedure. At 20 rpm rotor speed first the rubber was loaded to the mixer followed by the addition of iodine flakes. These were mixed for two minutes at 60 rpm rotor speed. During this mixing step the temperature increased from 100° C. to about 123-124° C. Next CaSt$_2$ was added at 20 rpm and the ingredients were mixed for another one minute at 60 rpm. This was followed by the addition of the dienophile, N,N'-(m-phenylene)bis-maleamic acid or MAAc, at 20 rpm and a final mixing step lasting for three minutes and using 60 rpm. Typical dump temperature was 131-132° C.

The samples modified with N,N'-(m-phenylene)bis-maleamic acid and MAAc were complemented with three controls. The first control Sample 42 was made by adding 2.89 phr CaSt$_2$ to SSBR and exposing the sample to the exact same mixing procedure used for the preparation of the modified samples. The second control Sample 45 was made by adding iodine and CaSt$_2$ to SSBR. This sample was prepared in order to determine if the conjugated diene generated by iodine had an interaction with carbon black on its own. The third control Sample 46 was the raw SSBR polymer. Table 15 lists the molecular weight averages of the samples. Shearing SSBR in the mixer had no significant effect on the molecular weight averages. A slight breakdown is indicated by the results. Iodine treatment of the samples resulted in an increase of molecular weight averages. All three molecular weight averages showed an increase. While Mn only increased by about 17%, Mz doubled suggesting that molecular weight increase occurred due to branching. Addition of the two different types of the dienophile,

TABLE 14

| | Sample No. | | | | |
|---|---|---|---|---|---|
| | 42 | 43 | 44 | 45 | 46 |
| Type | control | inv | inv | control | control |
| I$_2$ [phr] | 0 | 1.02 | 1.02 | 1.02 | 0 |
| I$_2$ [mmol/kg] | 0 | 40 | 40 | 40 | 0 |
| CaSt$_2$ [phr] | 2.89 | 2.89 | 2.89 | 2.89 | 0 |
| CaSt$_2$ [mmol/kg] | 40 | 40 | 40 | 40 | 0 |
| MPBMA[1] [phr] | 0 | 1.22 | 0 | 0 | 0 |
| MPBMA [mmol/kg] | 0 | 40 | 0 | 0 | 0 |
| MAAc[2] [phr] | 0 | 0 | 0.46 | 0 | 0 |
| MAAc [mmol/kg] | 0 | 0 | 40 | 0 | 0 |

[1]N,N'-(m-phenylene) bismaleamic acid
[2]maleamic acid the bi-functional N,N'-(m-phenylene)bismaleamic acid and the mono-functional MAAc, did not seem to alter the molecular weight increase regardless of its functionality. This implies that the branching occurred via the Diels-Alder reaction of two conjugated diene structures or a conjugated structure and a 1,4 or 1,2 butadiene enchainment.

TABLE 15

| Sample No. | M$_n$ [kDalton] | M$_w$ [kDalton] | M$_z$ [KDalton] | M$_w$/M$_n$ |
|---|---|---|---|---|
| 42 | 118 | 193 | 326 | 1.64 |
| 43 | 142 | 283 | 662 | 1.99 |
| 44 | 141 | 281 | 657 | 1.99 |
| 45 | 139 | 295 | 717 | 2.12 |
| 46 | 126 | 206 | 338 | 1.63 |

Figure 48:
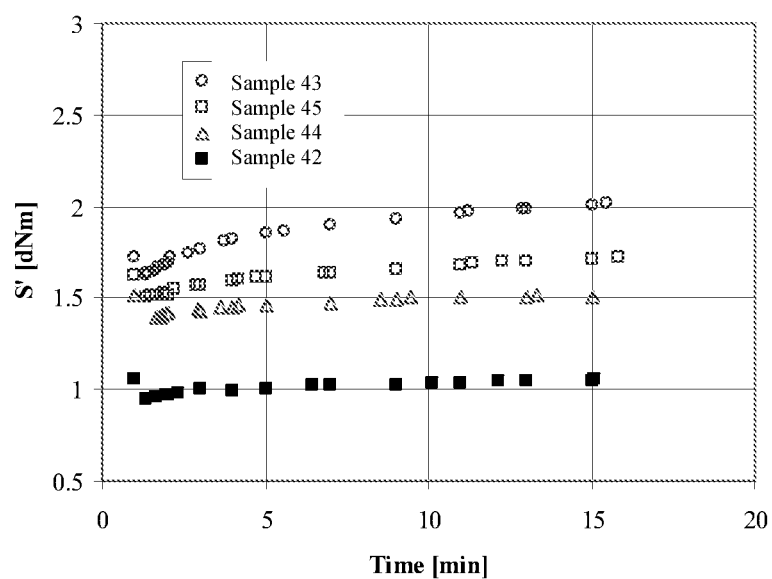

Heat treatment of the samples for longer times and higher temperatures provided more insight into the undergoing reactions. FIG. 48 shows the elastic torque development of the samples recorded during a 16 minutes and 160° C. heat cycle and measured using 1.667 Hz and 7% strain. Minimum, maximum S' values along with delta torque and % torque increase are listed in Table 16. All three modified samples have a higher starting S' value compared to the control due to the higher molecular weight of these samples. The highest torque increase, albeit relatively small, is shown by the sample modified by N,N'-(m-phenylene)bismaleamic acid. Apparently some further branching occurs at elevated temperature via Diels-Alder reaction between the conjugated diene and the maleamic acid groups of the N,N'-(m-phenylene)bismaleamic acid. The sample treated with iodine only has a marginal torque increase probably via the Diels-Alder reaction of two conjugated diene structures or a conjugated structure and a 1,4 or 1,2 butadiene enchainment. The sample treated with maleamic acid has very limited torque increase, similar to that of the control sample. This suggests that the reaction of the monofunctional maleamic acid with the conjugated diene prevents further crosslinking reaction.

TABLE 16

| | Sample No. | | | |
|---|---|---|---|---|
| | 42 | 43 | 44 | 45 |
| $S'_{max}$ [dNm] | 1.06 | 2.02 | 1.52 | 1.72 |
| $S'_{min}$ [dNm] | 0.95 | 1.62 | 1.39 | 1.5 |
| $S'_{max} - S'_{min}$ [dNm] | 0.11 | 0.4 | 0.13 | 0.22 |
| Increase [%] | 11.6 | 24.7 | 9.4 | 14.7 |

Example 15

In this example the effect of mixing the modified elastomers of Example 14 with carbon black is illustrated. The samples of Example 14 were compounded with 50 phr general purpose tread black and 20 phr medium process oil using the HaakeBuchler System 40 drive unit equipped with a 75 ml Rheomixer® mixer head. The starting temperature was set at 130° C. First the rubber was loaded using 20 rpm followed by the slow addition of the black mixed with oil. This step was carried out at 20 rpm and lasted for 1 minute. The ingredients were mixed for 1.5 minute at 60 rpm followed by a sweep and a second mixing step lasting for 1 minute at 60 rpm. Samples modified with N,N'-(m-phenylene)bismaleamic acid and iodine only gave the highest dump temperature and torque, 162° C., 4800 mg and 169° C., 5900 mg respectively. Sample modified with MAAc gave 156° C. and 4200 mg and the control sample 152° C. and 3800 mg. Samples dumped at higher torque appeared to be more rough on the surface after milling. The control sample was smooth.

Figure 49:
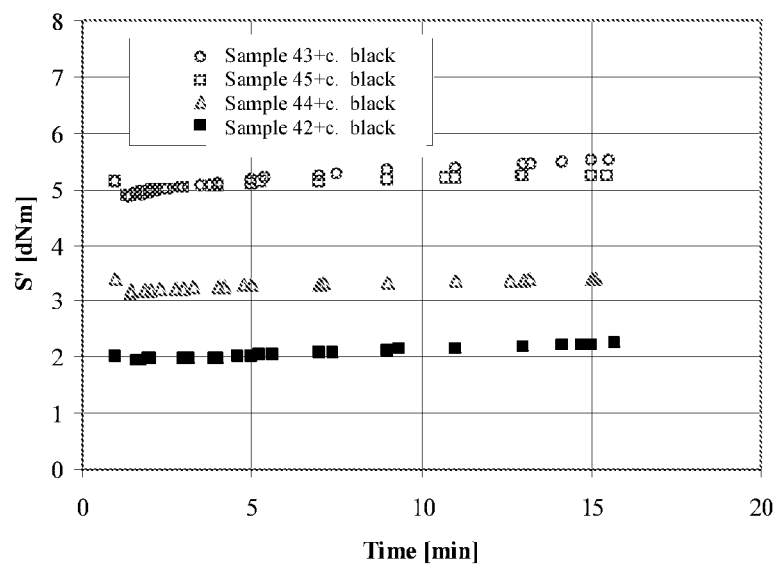

The tendency of the modified samples to branch seemed to diminish in the presence of carbon black. FIG. 49 shows the cure curves of the black compounds recorded at 160° C. using 7% strain and 1.667 Hz frequency. Torque increase is small and it appears to be similar for all samples except the N,N'-(m-phenylene)bismaleamic acid modified one. This sample gave about twice as high torque increase than the rest of the samples. The recorded characteristic torque values are listed in Table 17. Most of the observed torque increase is related to the flocculation of the filler particles. At lower strains it is more prevalent than at 7% strain used for these measurements due to the strain dependence of the moduli. Therefore the modulus increase at 0.28% strain was also determined during the 16 minutes 160° C. heat treatment of the samples. Table 18 lists the results.

TABLE 17

| | Sample No. | | | |
|---|---|---|---|---|
| | 42 | 43 | 44 | 45 |
| $S'_{max}$ [dNm] | 2.24 | 5.52 | 3.4 | 5.24 |
| $S'_{min}$ [dNm] | 1.94 | 4.84 | 3.16 | 4.89 |
| $S'_{max} - S'_{min}$ [dNm] | 0.30 | 0.68 | 0.24 | 0.35 |

TABLE 17-continued

| | Sample No. | | | |
|---|---|---|---|---|
| | 42 | 43 | 44 | 45 |
| Increase [%] | 15 | 14 | 8 | 7 |
| G' (0.83 Hz, 100° C., 15%) [kPa] | 192 | 467 | 327 | 469 |

TABLE 18

| | Sample No. | | | |
|---|---|---|---|---|
| | 42 | 43 | 44 | 45 |
| $G'_{min}$ [MPa] | 0.31 | 0.55 | 0.40 | 0.54 |
| $G'_{max}$ [MPa] | 0.62 | 0.70 | 0.51 | 0.65 |
| $G'_{max} - G'_{min}$ [MPa] | 0.32 | 0.15 | 0.11 | 0.11 |
| Increase [%] | 103 | 28 | 26 | 21 |

According to the results listed in Table 18, the elastic modulus of the control compound doubled. In contrast, all the modified samples displayed a less significant modulus increase. Their modulus increased by about 25%. This implies that all modified samples had a stronger interaction with black due to their respective functional groups. The most surprising is the sample modified with iodine only. This sample contains no acidic or amine groups which may interact with the polar surface groups of the carbon black as it may be the phenomenon in case of the N,N'-(m-phenylene)bismaleamic acid or MAAc modified samples. One possible explanation is a Diels-Alder reaction between the conjugated diene groups of the polymer and the quinone like structures of the carbon black. Quinones are particularly common dienophiles along with maleic anhydride. In Diels-Alder reactions another conjugated diene could also act as the dienophile. Therefore, it possible that the reaction takes place between the conjugated diene of the polymer and that of the carbon black. It is also known that condensed aromatic rings could act as a conjugated diene. While benzene, naphthalene and phenanthrene are quite resistant, Diels-Alder reaction proceeds readily with anthracene and with other fused ring systems having at least three linear benzene rings.

Figure 50:
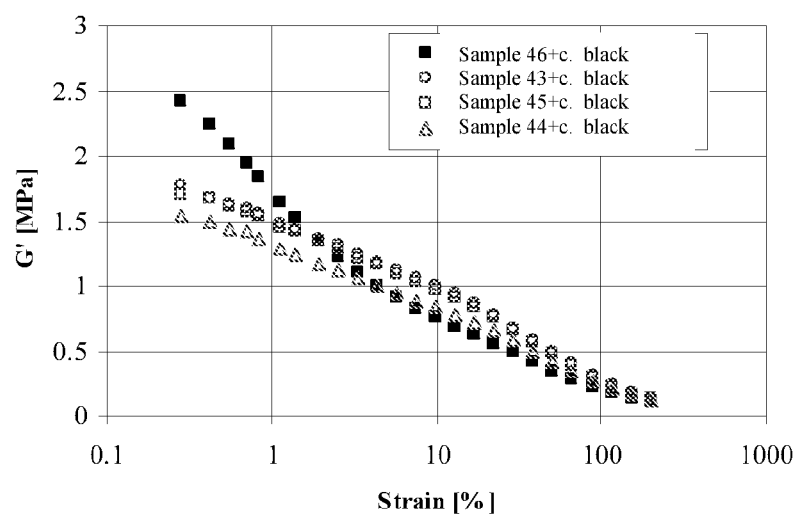
Figure 51:
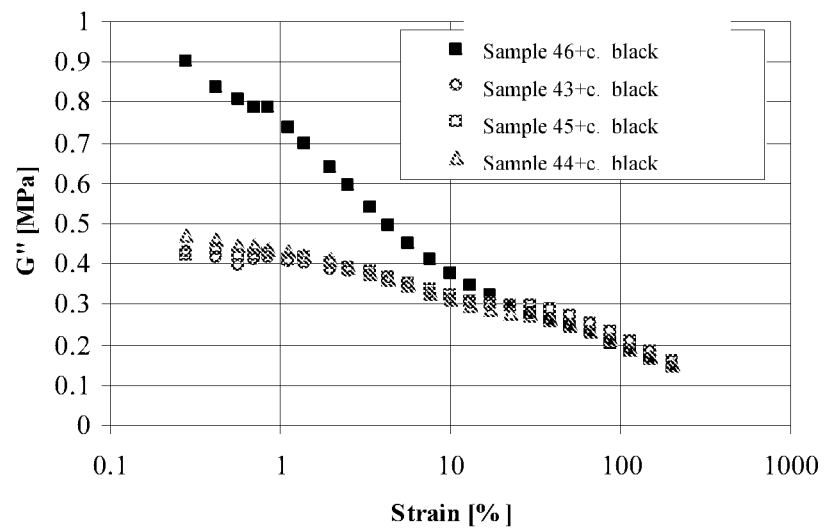
Figure 52:
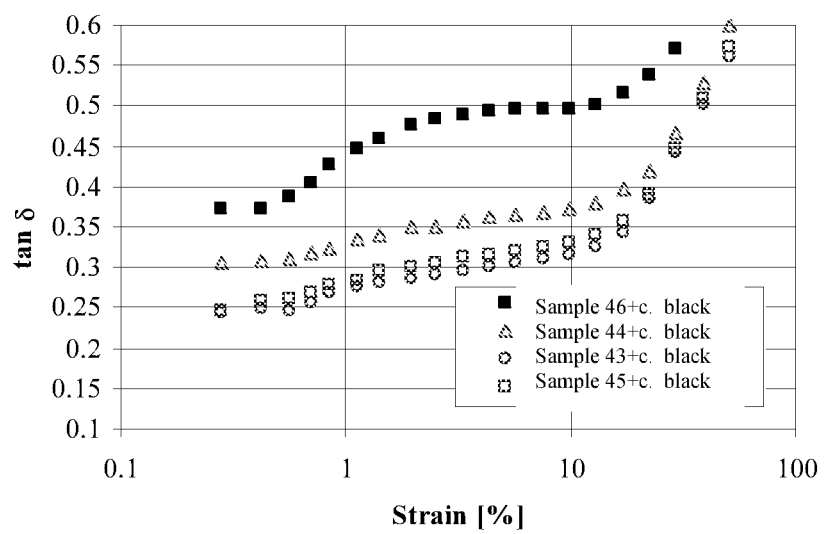

Strain sweeps conducted at 40° C. on the heat-treated samples indicated the stronger polymer-carbon black interaction as was suggested by the filler flocculation measurements. Strain dependence of G' and G" of the modified samples were measured to be lower than that of the control sample. FIGS. 50 and 51 show the results. These changes also resulted in a reduced tan δ value in the entire frequency range as shown by FIG. 52.

Reduced strain dependence of G' and G" of the modified samples as well as the reduced phase angle compared to the control sample suggests an increased polymer filler interaction.

In case of N,N'-(m-phenylene)bismaleamic acid the likely pathway of polymer-filler interaction is a Diels-Alder reaction between the maleamic acid group of N,N'-(m-phenylene)bismaleamic acid and the carbon black. Chemical modification of carbon black via Diels-Alder reaction, i.e, by reaction with maleic acid derivative has been reported. Experimental observations were substantiated by a model reaction suggesting Diels-Alder reaction between anthracene and maleic dodecylamide.

Interaction of the $I_2$ modified SSBR with carbon black is surprising and no prior work could be found in the literature investigating the reaction of carbon black with conjugated dienes. A Diels-Alder reaction between the quinone like structure of carbon black and the conjugated diene can be an explanation for the improved polymer-filler interaction. It is well established that a number of functional groups, such as quinones, hydroquinones, carboxylic acids, and lactones, are present at the edges of the graphitic layers planes of the carbon black.

Improved filler-polymer interaction in case of the MAAc modified sample remains obscure as the observed changes, at least in part, can also be a result of the reaction of unreacted conjugated diene with carbon black. However, the low cure activity of the MAAc modified sample compared to the $I_2$ modified sample indicates that most of the conjugated diene was consumed by MAAc (see FIG. 48 and Table 16).

The exact quantification of improvement is difficult based on this sample set due to the higher molecular weight averages of modified samples caused by branching. Reduction of phase angel upon cure is well known. The higher G' values of the modified samples over the control at strain values exceeding 2% (see FIG. 50) could also be a result of branching. This cross over of the curves was absent in silica filled compounds. However, in case of carbon black filled emulsion SBR it was shown that increased surface activity of the filler can also result in a cross over of G'.

Example 16

In this example, the effect of starting temperature on the molecular weight of the modified SSBR is illustrated. As part of the observed changes of Examples 14 and 15 can also be attributed to the higher molecular weight of the modified samples compared to the control sample, a set of modified sample was produced at a reduced temperature.

SSBR was modified in a similar manner as in Examples 14 and 15 except the starting temperature was lowered from 100° C. to 60° C. The compositions of Samples 47 through 51 are shown in Table 19. Also mixing time was reduced from two minutes to one minute after the addition of iodine. The rest of the mixing protocol was unchanged. Table 19a contains the measured molecular weight averages of the modified samples along with the values of previous controls. Apparently these changes in reaction conditions almost completely eliminated molecular weight increase. According to the results only Mz shows some marginal increase over the controls. Mn and Mw values are practically unchanged.

TABLE 19

| | Sample No. | | | | |
|---|---|---|---|---|---|
| | 47 | 48 | 49 | 50 | 51 |
| Type | control | control | inv | inv | control |
| $I_2$ [phr] | 0 | 0 | 1.02 | 1.02 | 1.02 |
| $I_2$ [mmol/kg] | 0 | 0 | 40 | 40 | 40 |
| $CaSt_2$ [phr] | 0 | 2.89 | 2.89 | 2.89 | 2.89 |
| $CaSt_2$ [mmol/kg] | 0 | 40 | 40 | 40 | 40 |
| MPBMA[1] [phr] | 0 | 0 | 1.22 | 0 | 0 |
| MPBMA [mmol/kg] | 0 | 0 | 40 | 0 | 0 |
| MAAc[2] [phr] | 0 | 0 | 0 | 0.46 | 0 |
| MAAc [mmol/kg] | 0 | 0 | 0 | 40 | 0 |

[1]N,N'-(m-phenylene) bismaleamic acid
[2]maleamic acid

TABLE 19a

| Sample No. | $M_n$ [kDalton] | $M_w$ [kDalton] | $M_z$ [kDalton] | $M_w/M_n$ |
|---|---|---|---|---|
| 47 | 126 | 206 | 338 | 1.63 |
| 48 | 118 | 193 | 326 | 1.64 |
| 49 | 130 | 214 | 379 | 1.65 |
| 50 | 124 | 211 | 365 | 1.70 |
| 51 | 126 | 213 | 362 | 1.69 |

Figure 53:
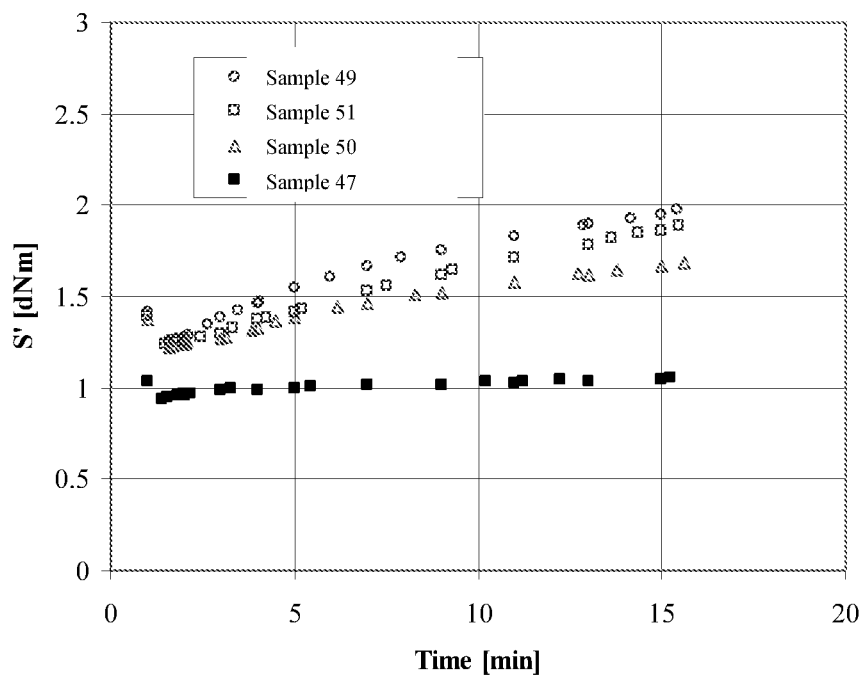

The ability of the modified raw polymers to undergo branching at higher temperatures is shown by FIG. 53. Samples were heated to 160° C. and torque increase was registered as a function of time using 7% strain at 1.667 Hz. The highest torque increase is shown by the $I_2$—N,N'-(m-phenylene)bismaleamic acid sample, and the lowest by the I2-MAAc one. Apparently part of the conjugated dienes reacted with the MAAc and this reduced the amount of conjugated diene available for cross-linking reaction.

Example 17

This example illustrates the effect of mixing carbon black with the samples of Example 16. The samples of Example 16 were compounded with 50 phr general purpose tread black and 20 phr medium process oil using the a 300 cm³ Rheomix☐ 3000E mixer head attached to a Haake Buchler HBI System 90 drive unit. The starting temperature of the mixing was reduced from 130° C. to 100° C. in order to avoid branching of the modified samples. To the mixer first half of the carbon black/oil mixture was added followed by the rubber and the remaining of the carbon black/oil mixture. This ensured that carbon black was present at the very beginning of the mixing step, which apparently reduces the cure activity of the modified samples. The ingredients were mixed for 2 minutes at 100 rpm. It was followed by a sweep and a second mixing step lasting for another two minutes and using 100 rpm rotor speed. The dump temperature and the torque registered at the end of the mixing cycles are listed in Table 20.

TABLE 20

| | Sample No. | | | |
|---|---|---|---|---|
| | 47 | 49 | 50 | 51 |
| $T_{dump}$ [° C.] | 156 | 161 | 159 | 157 |
| Final Torque [mg] | 8600 | 9900 | 9700 | 9600 |

The slightly increased dump temperature and higher final torque obtained with the modified samples indicate a stronger polymer-filler interaction.

Figure 54:
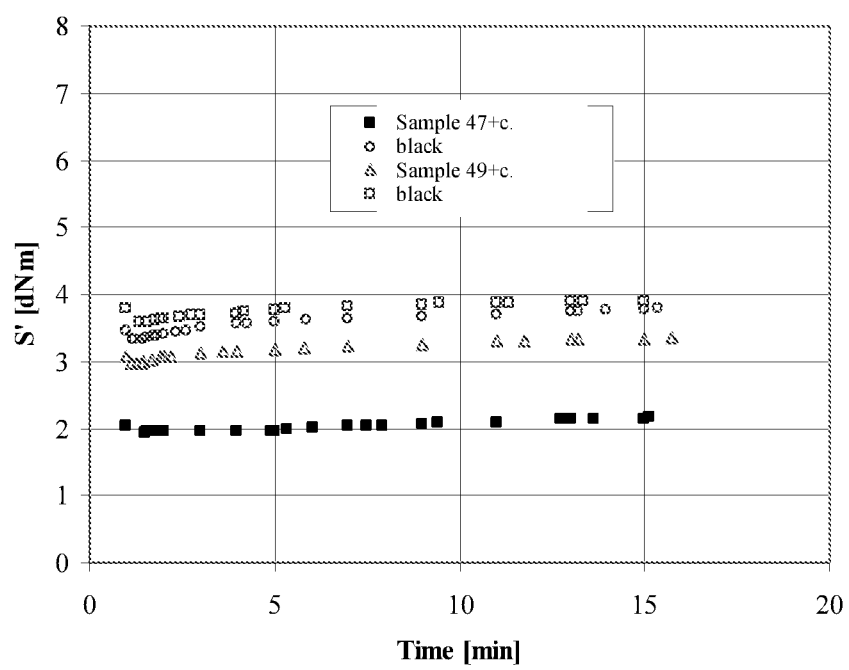

The cure activity of the modified samples has diminished in the presence of carbon black. FIG. 54 shows the elastic torque development of the compounds measured at 160° C. Table 21 lists the characteristic torque values along with the G' value measured at 100° C. at 15% strain and 0.83 Hz. The higher G' value of the modified samples implies enhanced filler reinforcement achieved by the improved polymer-filler interaction.

TABLE 21

| | Sample No. | | | |
|---|---|---|---|---|
| | 47 | 49 | 50 | 51 |
| Type | control | inv | inv | control |
| S'$_{max}$ [dNm] | 2.16 | 3.8 | 3.35 | 3.9 |
| S'$_{min}$ [dNm] | 1.94 | 3.32 | 2.96 | 3.59 |
| S'$_{max}$ − S'$_{min}$ [dNm] | 0.22 | 0.48 | 0.39 | 0.31 |
| Increase [%] | 11 | 14 | 13 | 9 |
| G' (0.83 Hz, 100° C., 15%) [kPa] | 188 | 333 | 300 | 362 |

Figure 55:
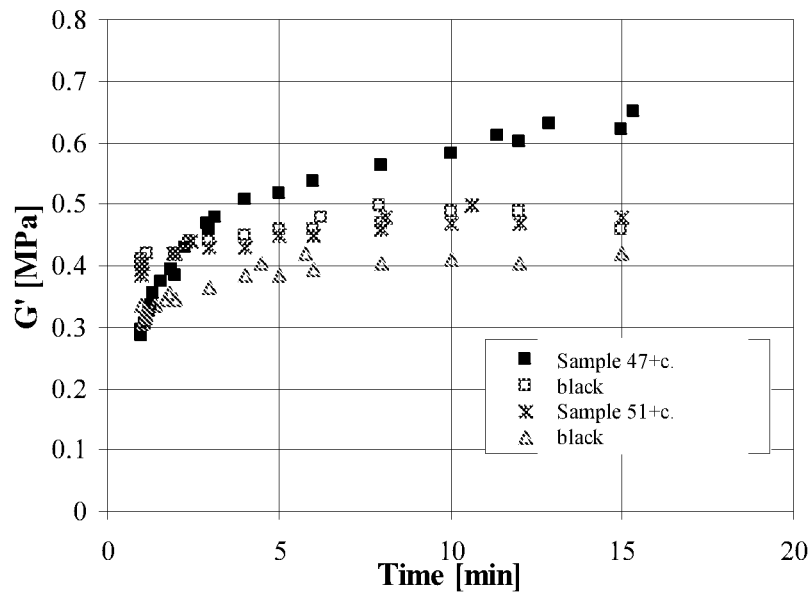

The modified samples showed a reduced low strain storage modulus at 160° C. compared to the control sample and their increase with time was significantly reduced as shown by FIG. 55. This is a result of enhanced polymer-filler interaction via the functional groups leading to inhibited filler flocculation.

Figure 56:
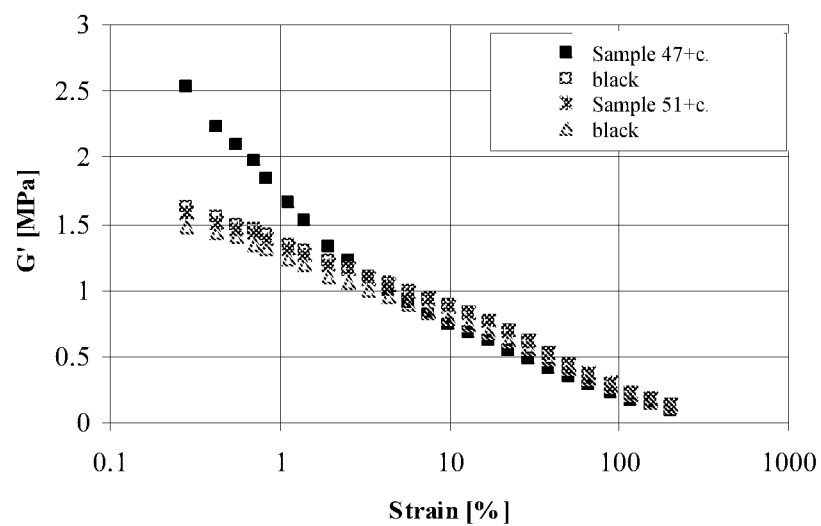
Figure 57:
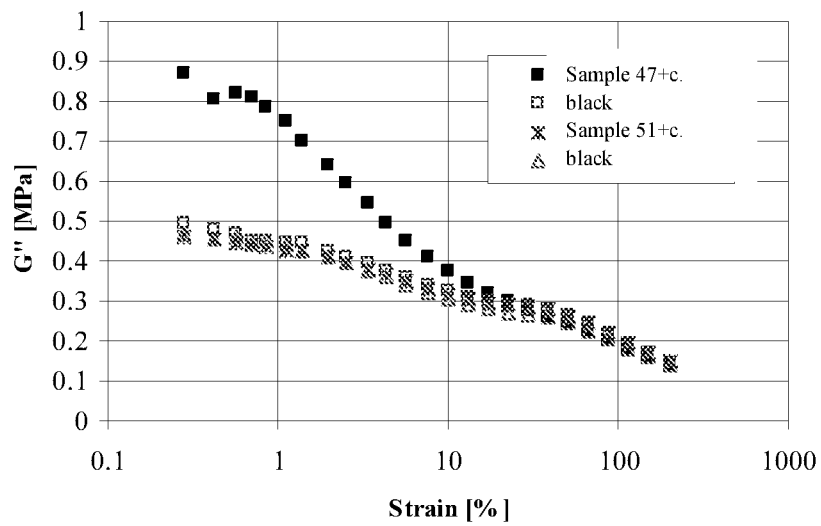
Figure 58:
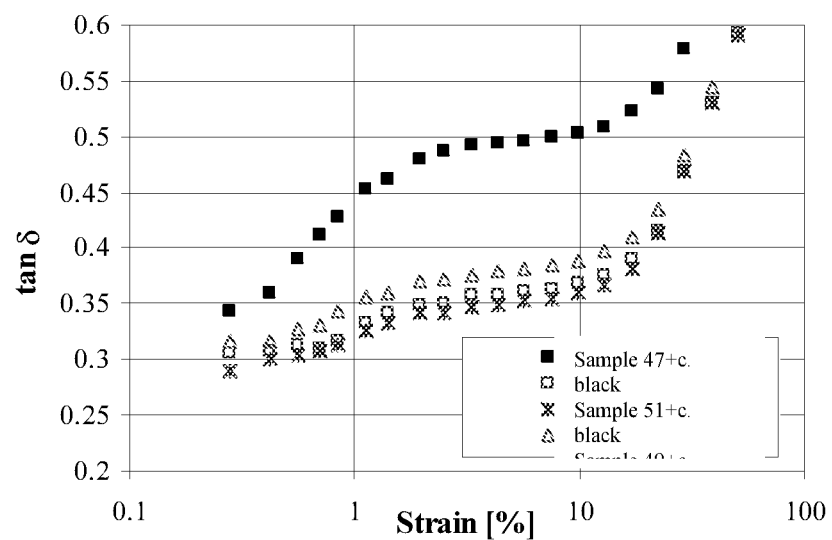

The modification of samples also resulted in a reduced Payne effect compared to the control as indicated by the strain sweeps conducted on the heat-treated samples at 40° C. G' of the modified samples at low strains is lower than that of the control (see FIG. 56). For example G' of all modified samples was measured to be about 40% lower at 0.28% strain compared to the control. However, G' over 3% strain appears to be somewhat higher than that of the control. This is indicative of an improved reinforcement. Loss modulus of the modified samples was also measured to be lower (see FIG. 57). At low strains it is about half of the low strain G" of the control sample. The stronger decrease of G" over G' resulted in a lower tan δ in the entire frequency ranges as shown by FIG. 58.

These measurements suggest that polymer-carbon black interaction can be improved by the functionalization method used. Diels-Alder reaction between carbon black and the maleamic group of N,N'-(m-phenylene)bismaleamic acid or the conjugated diene is the likely reason for these improvements.

Example 18

This example illustrates the modification of a synthetic polyisoprene. Type of chemicals and their concentration was exactly the same as in case of SSBR, as shown in Table 22.

TABLE 22

| | Sample No. | | | | |
|---|---|---|---|---|---|
| | 52 | 53 | 54 | 55 | 56 |
| Type | control | control | inv | inv | control |
| I$_2$ [phr] | 0 | 0 | 1.02 | 1.02 | 1.02 |
| I$_2$ [mmol/kg] | 0 | 0 | 40 | 40 | 40 |
| CaSt$_2$ [phr] | 0 | 2.89 | 2.89 | 2.89 | 2.89 |
| CaSt$_2$ [mmol/kg] | 0 | 40 | 40 | 40 | 40 |
| MPBMA[1] [phr] | 0 | 0 | 1.22 | 0 | 0 |
| MPBMA [mmol/kg] | 0 | 0 | 40 | 0 | 0 |
| MAAc[2] [phr] | 0 | 0 | 0 | 0.46 | 0 |
| MAAc [mmol/kg] | 0 | 0 | 0 | 40 | 0 |

[1]N,N'-(m-phenylene) bismaleamic acid
[2]maleamic acid

Chemical treatment of synthetic polyisoprene (Natsyn 2200) was carried out in a 300 ml mixer head using the following procedure. At 20 rpm rotor speed first the rubber was loaded to the mixer followed by the addition of iodine flakes. These were mixed for two minutes at 60 rpm rotor speed. During this mixing step the temperature increased from 100° C. to about 117-122° C. Next CaSt$_2$ was added at 20 rpm and the ingredients were mixed for another one minute at 60 rpm. This was followed by the addition of the dienophile, N,N'-(m-phenylene)bismaleamic acid or MAAc, at 20 rpm and a final mixing step lasting for three minutes and using 60 rpm. Typical dump temperature was 128-129° C.

GPC measurements revealed a strong molecular weight breakdown during iodine treatment as shown by Table 22a. M$_n$ of the iodine treated samples reduced to about half compared to the virgin polyisoprene or the sheared control. Shearing of the polyisoprene also reduced its M$_w$ and M$_z$ compared to the virgin material.

Breakdown of polyisoprene during I$_2$ modification has already been reported and molecular weight decrease was found to be proportional to the iodine concentration.

TABLE 22a

| Sample No. | M$_n$ [kDalton] | M$_w$ [kDalton] | M$_z$ [kDalton] |
|---|---|---|---|
| 52 | 450 | 1217 | 3208 |
| 53 | 442 | 862 | 1714 |
| 54 | 228 | 512 | 1307 |
| 55 | 264 | 542 | 1220 |
| 56 | 284 | 579 | 1403 |

As these molecular weight differences can alter the polymer-filler interaction an attempt was made to reduce or eliminate the strong molecular weight brake-down during iodine treatment. It was hypothesized that the breakdown is caused by a radical chain reaction initiated by radicals (R'*) formed by the shear degradation of polyisoprene.

| Initiation: | R'* + I$_2$ → R'− I + I* |
|---|---|
| Propagation: | I* + RH → R* + HI |
| | R* + I$_2$ → R − I + I* |
| Termination: | R* + X* → R − X |

Example 19

This example illustrates the effect of adding a reaction modifier to the reaction system of Example 18 is illustrated. Samples 57 through 61 were identical to Samples 52 through 56 except for the addition of a stable free radical, 4-Hydroxy-2,2,6,6-tetramethylpiperidine-N-oxyl (HO-TEMPO) to the samples prior to iodine addition in order to stop the chain reaction.

According to the GPC measurements listed in Table 23 the excessive chain degradation due to iodine addition was successfully eliminated. Molecular weight averages of the sheared control and the samples modified by iodine treatment were measured to be about the same.

Figure 59:
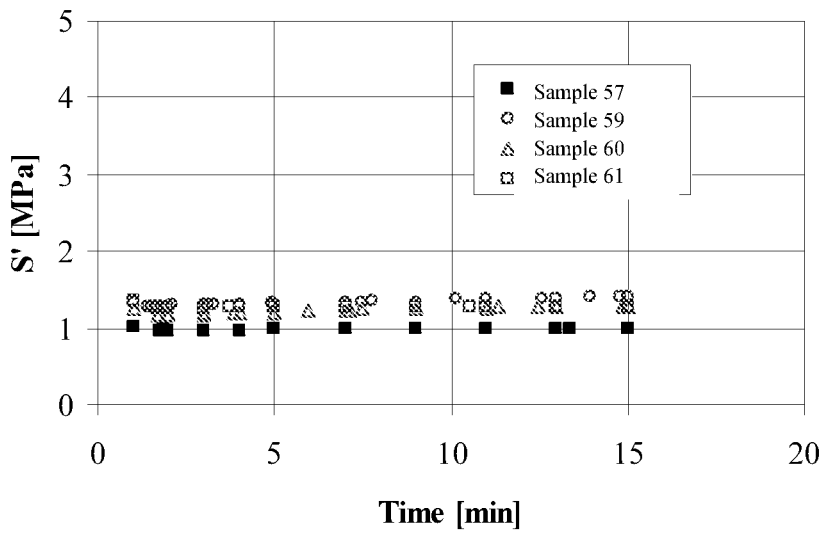

The sheared control and the modified samples showed no cure activity at 160° C. as illustrated by FIG. 59. This allowed the comparison of polymer-filler interaction of different functional groups free from molecular weight effects.

TABLE 23

| Sample No. | M$_n$ [kDalton] | M$_w$ [kDalton] | M$_z$ [kDalton] |
|---|---|---|---|
| 57 | 443 | 1031 | 2371 |
| 58 | 379 | 703 | 1455 |
| 59 | 461 | 874 | 1832 |

TABLE 23-continued

| Sample No. | $M_n$ [kDalton] | $M_w$ [kDalton] | $M_z$ [kDalton] |
|---|---|---|---|
| 60 | 420 | 799 | 1728 |
| 61 | 422 | 798 | 1677 |

Example 20

This example illustrate the effect of mixing carbon black with the samples of Example 19.

Figure 60:
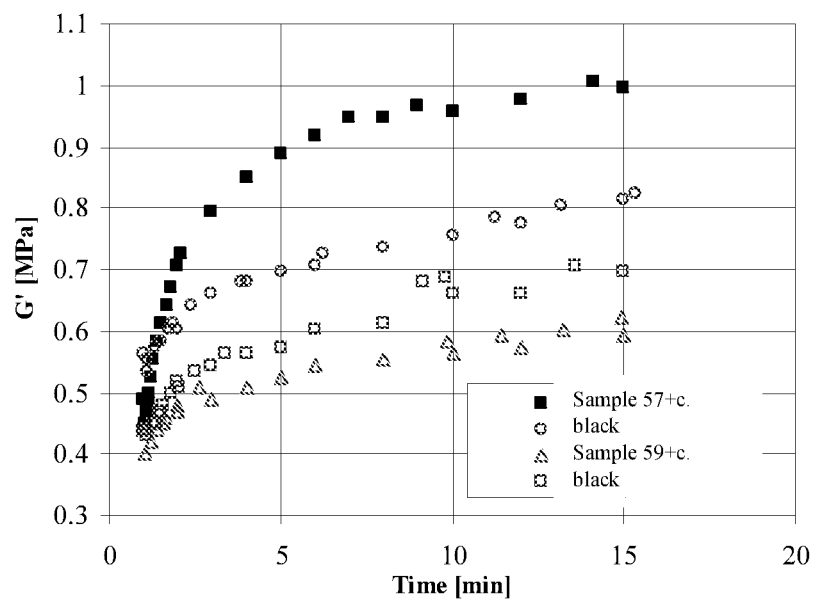

The ability of the functional groups to prevent the flocculation of carbon black was measured at 160° C. FIG. 60 shows the increase of the elastic modulus at this temperature measured at 0.28% strain and 1.667 Hz. The most significant increase is shown by the control sample. G' of the control sample increased by 120%. The rest of the samples show a 50-60% increase indicating a stronger polymer filler interaction compared to the control sample due to the interaction of their respective functional groups with carbon black. These results are very similar to that observed in case of SSBR.

Figure 61:
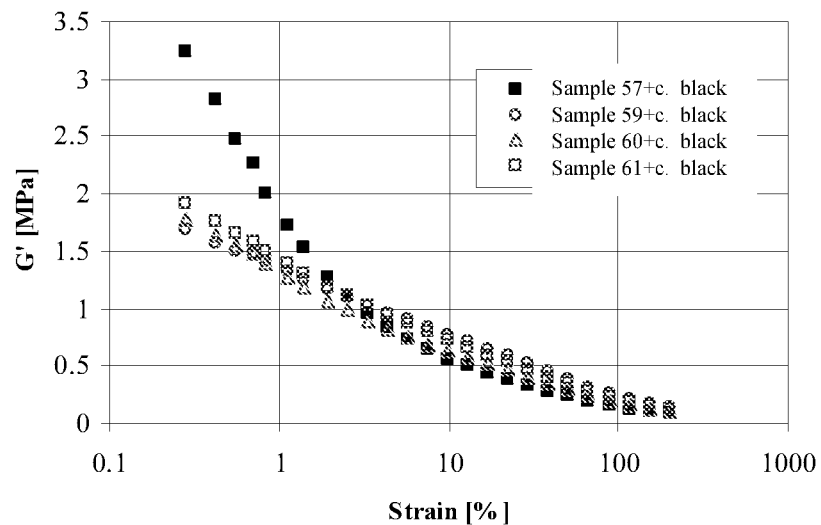
Figure 62:
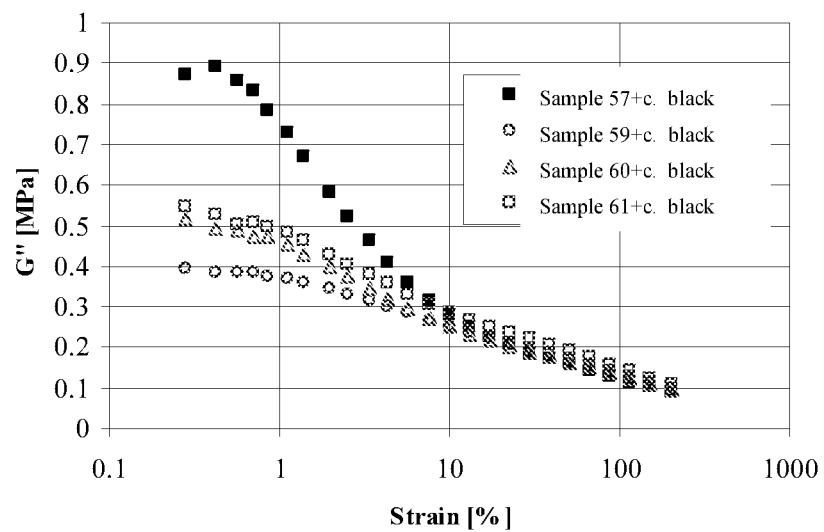

Strain sweeps were carried out on the heat-treated samples at 40° C. The results shown by FIGS. 61 and 62 reveal that the Payne effect was substantially decreased by all functionalization method. The loss and storage moduli of modified samples appear to be similar and they are less strain dependent than that of the control. Amongst the modified samples, G" of the $I_2$—N,N'-(m-phenylene)bismaleamic acid sample was measured to be the lowest and this resulted in the lowest tan δ accordingly (see FIG. 63).

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a functionalized elastomer, comprising the steps of
    A) obtaining a diene-based elastomer selected from the group consisting of natural rubber, synthetic polyisoprene, polybutadiene, solution polymerized styrene-butadiene rubber (SSBR), and emulsion polymerized styrene-butadiene rubber (ESBR);
    B) mixing a combination consisting of the diene-based elastomer, a halogenating agent, and optionally an acid acceptor to form an intermediate elastomer comprising a halogen, wherein the halogenating agent is selected from the group consisting of iodine, bromine, 1,3-dibromo-5,5-dimethyl hydantoin, and N-bromosuccinimide;
    C) heating the intermediate elastomer comprising a halogen and removing the halogen to form an elastomer comprising conjugated diene bonds; and
    D) mixing a combination consisting of the elastomer comprising conjugated diene bonds and a dienophile comprising a filler-active functional group to form a functionalized elastomer.

2. The method of claim 1, wherein the halogenating agent is added to the diene-based elastomer in an amount ranging from about 0.1 to about 2 parts by weight of halogenating agent per 100 parts by weight of diene-based elastomer (phr).

3. The method of claim 1, wherein the halogenating agent is added to the diene-based elastomer in an amount ranging from about 0.25 to about 1.5 parts by weight of halogenating agent per 100 parts by weight of diene-based elastomer (phr).

4. The method of claim 1, wherein the dienophile comprising a filler-active functional group is selected from the group consisting of bismaleamic acid, bismaleimide, 1,3-bis(citraconimidomethyl)benzene, maleic anhydride, N,N'-(m-phenylene)bismaleamic acid, N,N'-(m-xylylene)bismaleamic acid; N,N'-(m-phenylene)biscitraconamic acid, N,N'-(m-xylylene)biscitraconamic acid, and 3-(triethoxysilyl)propyl N-maleamic acid.

5. The method of claim 1, wherein the dienophile comprising a filler-active functional group is added to the intermediate elastomer in an amount ranging from about 0.1 to about 2 parts by weight of dienophiles comprising a filler-active functional group per 100 parts by weight of diene-based elastomer (phr).

6. The method of claim 1, wherein the dienophile comprising a filler-active functional group is added to the intermediate elastomer in an amount ranging from about 0.25 to about 1.5 parts by weight of halogenating agent per 100 parts by weight of diene-based elastomer (phr).

7. The method of claim 1, wherein the combination includes from 1 to 10 phr of an acid acceptor.

8. The method of claim 1, wherein the halogenating agent is selected from the group consisting of iodine and bromine.

* * * * *